US009374583B2

(12) United States Patent
Wang

(10) Patent No.: US 9,374,583 B2
(45) Date of Patent: Jun. 21, 2016

(54) VIDEO CODING WITH IMPROVED RANDOM ACCESS POINT PICTURE BEHAVIORS

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 413 days.

(21) Appl. No.: 13/952,340

(22) Filed: Jul. 26, 2013

(65) Prior Publication Data

US 2014/0079140 A1    Mar. 20, 2014

Related U.S. Application Data

(60) Provisional application No. 61/703,695, filed on Sep. 20, 2012.

(51) Int. Cl.
*H04N 7/26* (2006.01)
*H04N 19/85* (2014.01)
*H04N 19/196* (2014.01)
*H04N 19/70* (2014.01)

(52) U.S. Cl.
CPC ....... *H04N 19/00903* (2013.01); *H04N 19/197* (2014.11); *H04N 19/70* (2014.11); *H04N 19/85* (2014.11)

(58) Field of Classification Search
None
See application file for complete search history.

(56) References Cited

U.S. PATENT DOCUMENTS

| 8,358,665 B2 | 1/2013 | Raveendran |
| 8,537,200 B2 | 9/2013 | Zhang et al. |
| 8,665,964 B2 | 3/2014 | Joshi et al. |
| 2010/0098156 A1 | 4/2010 | Karczewicz et al. |
| 2012/0230401 A1 | 9/2012 | Chen et al. |

(Continued)

FOREIGN PATENT DOCUMENTS

| TW | 201123909 A | 7/2011 |
| TW | 201126967 A | 8/2011 |

(Continued)

OTHER PUBLICATIONS

Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.

(Continued)

*Primary Examiner* — Kate Luo
(74) *Attorney, Agent, or Firm* — Shumaker & Sieffert, P.A.

(57) ABSTRACT

This disclosure describes techniques for selection of coded picture buffer (CPB) parameters used to define a CPB for a video coding device for clean random access (CRA) pictures and broken link access (BLA) pictures in a video bitstream. A video coding device receives a bitstream including one or more CRA pictures or BLA pictures, and also receives a message indicating whether to use an alternative set of CPB parameters for at least one of the CRA pictures or BLA pictures. The message may be received from an external means, such as a processing means included in a streaming server or network entity. The video coding device sets a variable defined to indicate the set of CPB parameters for a given one of the pictures based on the received message, and selects the set of CPB parameters for the given one of the pictures based on the variable for the picture.

43 Claims, 9 Drawing Sheets

(56) References Cited

U.S. PATENT DOCUMENTS

2012/0230433 A1 9/2012 Chen et al.
2012/0259994 A1 10/2012 Gillies et al.

FOREIGN PATENT DOCUMENTS

| TW | 201130306 A | 9/2011 |
| WO | 2011002813 A1 | 1/2011 |
| WO | 2013012372 A1 | 1/2013 |

OTHER PUBLICATIONS

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "Proposed Editorial Improvements for High efficiency video coding (HEVC) Text Specification Draft 8," JCT-VC Meeting; MPEG Meeting; Shanghai; (Joint Collaborative Team on Video Coding of ISO/IEC JTC1/SC29/WG11 and ITU-T SG.16); URL: http://wftp3.itu.int/av-arch/jctvc-site/,, No. Document JCTVC-K0030_v3, Oct. 10-19, 2012, 277 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

International Search Report and Written Opinion—PCT/US2013/056904—ISA/EPO—Nov. 29, 2013, 9 pp.

ITU-T H.264, Series H: Audiovisual and Multimedia Systems, Infrastructure of audiovisual services—Coding of moving video, Advanced video coding for generic audiovisual services, The International Telecommunication Union, Jun. 2011, 674 pp.

Sullivan et al., "Overview of the High Efficiency Video Coding (HEVC) Standard," IEEE Transactions on Circuits and Systems for Video Technology, vol. 22, No. 12, Dec. 2012, pp. 1649-1668.

Wang et al., "On bitstreams starting with CRA pictures," MPEG Meeting; San Josa CR; (Motion Picture Expert Group or ISO/IEC JTC1/SC29/WG11), No. m23377, Document JCTVC-H0496, Feb. 1-10, 2012, 6 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

ITU-T H.265, Series H: Audiovisual and Multimedia Systems, Infrastructure of audiovisual services—Coding of moving video, High efficiency video coding, The International Telecommunication Union, Apr. 2013, 317 pp.

ITU-T H.264, Series H: Audiovisual and Multimedia Systems, Infrastructure of audiovisual services—Coding of moving video, Advanced video coding for generic audiovisual services, The International Telecommunication Union, Mar. 2005, 343 pp.

Second Written Opinion of international application No. PCT/US2013/056904, mailed Aug. 27, 2014, 6 pp.

International Preliminary Report on Patentability from corresponding PCT Application Serial No. PCT/US2013/056904 dated Dec. 23, 2014 (25 pages).

ITU-T H.265, Series H: Audiovisual and Multimedia Systems, Infrastructure of audiovisual services—Coding of moving video, Advanced video coding for generic audiovisual services, The International Telecommunication Union, Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union, Apr. 2015, 634 pp.

VIDEO CODING WITH IMPROVED RANDOM ACCESS POINT PICTURE BEHAVIORS

This application claims the benefit of U.S. Provisional Application No. 61/703,695, filed Sep. 20, 2012, the entire content of which is incorporated herein by reference.

TECHNICAL FIELD

This disclosure generally relates to processing video data and, more particularly, random access pictures used in video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs' and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques to provide improved support of random access point (RAP) pictures, including clean random access (CRA) pictures and broken link access (BLA) pictures, in video coding. In some cases, RAP pictures may alternatively be referred to as intra random access point (IRAP) pictures. In particular, this disclosure describes techniques for selection of coded picture buffer (CPB) parameters used to define a CPB for a video coding device for CRA pictures or BLA pictures in a video bitstream. Either a default set or an alternative set of CPB parameters may be used to define the CPB. If the default set is used when the alternative set should have been selected, the CPB may overflow.

In one example, the disclosure is directed toward a method of processing video data comprising receiving a bitstream representing a plurality of pictures including one or more of CRA pictures or BLA pictures, and receiving a message indicating whether to use an alternative set of CPB parameters for at least one of the CRA pictures or the BLA pictures. The method further comprises setting a variable defined to indicate the set of CPB parameters for the one of the CRA pictures or the BLA pictures based on the received message, and selecting the set of CPB parameters for the one of the CRA pictures or the BLA pictures based on the variable for the picture.

In another example, the disclosure is directed toward a video coding device for processing video data, the device comprising a CPB configured to store video data, and one or more processors configured to receive a bitstream representing a plurality of pictures including one or more of CRA pictures or BLA pictures, receive a message indicating whether to use an alternative set of CPB parameters for at least one of the CRA pictures or the BLA pictures, setting a variable defined to indicate the set of CPB parameters for the one of the CRA pictures or the BLA pictures based on the received message, and selecting the set of CPB parameters for the one of the CRA pictures or the BLA pictures based on the variable for the picture.

In a further example, the disclosure is directed toward a video coding device for processing video data, the device comprising means for receiving a bitstream representing a plurality of pictures including one or more of CRA pictures or BLA pictures, means for receiving a message indicating whether to use an alternative set of CPB parameters for at least one of the CRA pictures or the BLA pictures, means for setting a variable defined to indicate the set of CPB parameters for the one of the CRA pictures or the BLA pictures based on the received message, and means for selecting the set of CPB parameters for the one of the CRA pictures or the BLA pictures based on the variable for the picture.

In an additional example, the disclosure is directed toward a computer-readable medium comprising instructions for processing video data, the instructions, when executed, cause one or more processors to receive a bitstream representing a plurality of pictures including one or more of CRA pictures or BLA pictures, receive a message indicating whether to use an alternative set of CPB parameters for at least one of the CRA pictures or the BLA pictures, set a variable defined to indicate the set of CPB parameters for the one of the CRA pictures or the BLA pictures based on the received message, and select the set of CPB parameters for the one of the CRA pictures or the BLA pictures based on the variable for the picture.

The details of one or more examples are set forth in the accompanying drawings and the description below. Other features, objects, and advantages will be apparent from the description and drawings, and from the claims.

DETAILED DESCRIPTION

This disclosure describes techniques to provide improved support of random access point (RAP) pictures, including clean random access (CRA) pictures and broken link access (BLA) pictures, in video coding. In some cases, RAP pictures may alternatively be referred to as intra random access point (RAP) pictures. In particular, this disclosure describes techniques for selection of coded picture buffer (CPB) parameters used to define a CPB for a video coding device for CRA pictures or BLA pictures in a video bitstream. A hypothetical reference decoder (FIRM relies on HRD parameters, which include buffering period information and picture timing information. The buffering period information defines CPB parameters, namely initial CPB removal delays and initial CPB removal delay offsets. Either a default set or an alternative set of CPB parameters may be used to define the CPB based on the type of picture used to initialize the HRD. If the default set is used when the alternative set should have been selected, the CPB in a video coding device that conforms to the HRD may overflow.

According to the techniques, a video coding device receives a bitstream representing a plurality of pictures including one or more CRA pictures or BLA pictures, and also receives a message indicating whether to use an alternative set of CPB parameters for each of the CRA pictures or the BLA pictures. The message may be received from an external means, such as a processing means included in a streaming server, an intermediate network element, or another network entity.

The video coding device sets a variable defined to indicate the set of CPB parameters for a given one of the CRA pictures or the BLA pictures based on the received message. The video coding device then selects the set of CPB parameters for the given one of the CRA pictures or the BLA pictures based on the variable for the picture. The selected set of CPB parameters is applied to a CPB included in a video encoder or video decoder to ensure that the CPB will not overflow during video coding. In some cases, the video coding device may set a network abstraction layer (NAL) unit type for the given one of the CRA pictures or the BLA pictures. The video coding device may set the NAL unit type for the picture as signaled, or the video coding device may set the NAL unit type based on the variable for the picture. The video coding device may select the set of CPB parameters for the given picture based on the NAL unit type and the variable for the picture.

Figure 1:
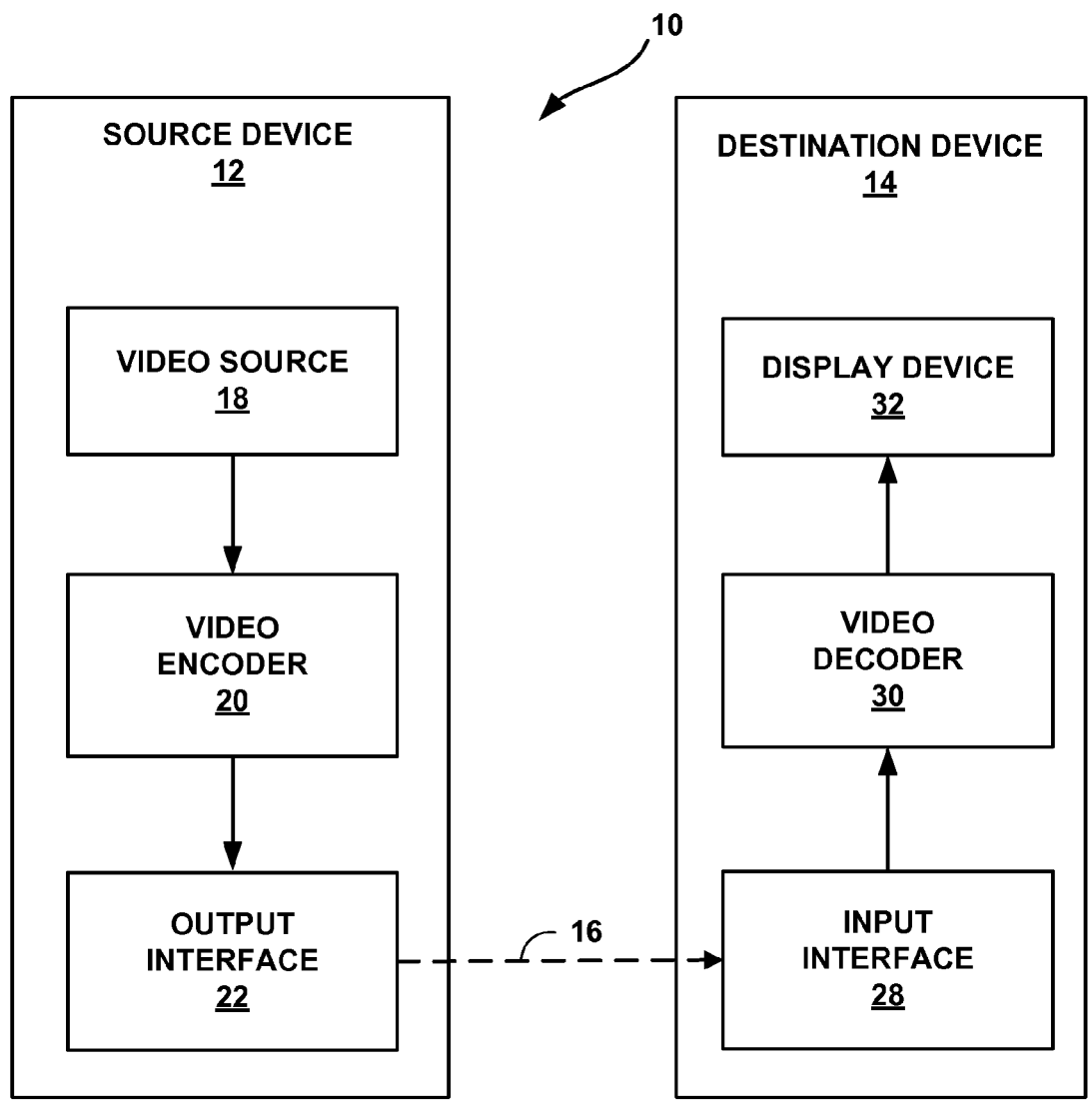
FIG. 1 is a block diagram illustrating an example video encoding and decoding system that may utilize the techniques described in this disclosure.

FIG. 1 is a block diagram illustrating an example video encoding and decoding system 10 that may utilize the techniques described in this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), FTP server, network attached storage (NAS) devices, or a local disk drive. Destination device 14 may access the encoded video data through any standard data connection, including an Internet connection. This may include a wireless channel (e.g., a connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques of this disclosure may be performed by any digital video encoding and/or decoding device. Although generally the techniques are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation 14.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (NT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Video coding standards may include a specification of a video buffering model. AVC and HEVC, the buffering model is referred to as a hypothetical reference decoder (HRD), which includes a buffering model of both a coded picture buffer (CPB) and a decoded picture buffer (DPB) included in video encoder 20 and/or video decoder 30, and the CPB and DPB behaviors are mathematically specified. The HRD directly imposes constraints different timing, buffer sizes and bit rates, and indirectly imposes constraints on bitstream characteristics and statistics. A complete set of HRD parameters includes five basic parameters: initial CPB removal delay, CPB size, bit rate, initial DPB output delay, and DPB size. In AVC and HEVC, bitstream conformance and decoder conformance are specified as parts of the HRD specification. Though it is named as a type of decoder, HRD is typically needed at the encoder side to guarantee bitstream conformance, i.e., conformance of the bitstream generated by the encoder to requirements of the decoder, white typically not needed at the decoder side.

In the AVC and HEVC HRD models, decoding or CPB removal is access unit based, and it is assumed that picture decoding is instantaneous. In practical applications, if a conforming decoder strictly follows the decoding times signaled, e.g., in the picture timing supplemental enhancement information (SEI) messages, to start decoding of access units, then the earliest possible time to output a particular decoded picture is equal to the decoding time of that particular picture plus the time needed for decoding that particular picture. Unlike the AVC and HEVC HRD models, the time needed for decoding a picture in the real world is not equal to zero. The terms "instantaneous" and "instantaneously" as used in this disclosure may refer to any duration of time that may be assumed to be instantaneous in one or more coding models or an idealized aspect of any one or more coding models, with the understanding that this may differ from being "instantaneous" in a physical or literal sense. For example, for purposes of this disclosure, a function or process may be considered to be nominally "instantaneous" if it takes place at or within a practical margin of a hypothetical or idealized earliest possible time for the function or process to be performed. Syntax and variable names as used herein may in some examples be understood in accordance with their meaning within the HEVC model.

The following descriptions of example hypothetical reference decoder (HRD) operation, example operation of a coded picture buffer, example timing of a bitstream arrival, example timing of decoding unit removal, example decoding of a decoding unit, example operation of a decoded picture buffer, example removal of pictures from a decoded picture buffer, example picture output, and example current decoded picture marking and storage are provided to illustrate examples of video encoder 20 and/or video decoder 30 that may be configured to store one or more decoding units of video data in a picture buffer, obtain a respective buffer removal time for the one or more decoding units, remove the decoding units from the picture buffer in accordance with the obtained buffer removal time for each of the decoding units, and code video data corresponding to the removed decoding units, among other functions. The operations may be defined or performed differently, in other examples. In this manner, video encoder 20 and/or video decoder 30 may be configured to operate according to the various examples of HRD operations described below.

The HRD may be initialized at any one of the buffering period supplemental enhancement information (SEI) messages. Prior to initialization, the CPB may be empty. After initialization, the HRD may not be initialized again by subsequent buffering period SEI messages. The access unit that is associated with the buffering period SEI message that initializes the CPB may be referred to as access unit 0. The decoded picture buffer may contain picture storage buffers. Each of the picture storage buffers may contain a decoded picture that is marked as "used for reference" or is held for future output. Prior to initialization, the DPB may, be empty.

The HRD (e.g., video encoder 20 and/or video decoder 30) may operate as follows. Data associated with decoding units that flow into the CPB according to a specified arrival schedule may be delivered by a hypothetical stream scheduler (HSS). In one example, the data associated with each decoding unit may be removed and decoded instantaneously by the instantaneous decoding process at CPB removal times. Each decoded picture may be placed in the DPB. A decoded picture may be removed from the DPB at the latter of the DPB output time or the time that it becomes no longer needed for inter-prediction reference.

The HRD relies on the HRD parameters, including CPB parameters of initial CPB removal delay and initial CPB removal delay offset. In some cases, the HRD parameters may be determined based a type of picture used to initialize the HRD. In the case of random access, the HRD may be initialized with a random access point (RAP) picture, such as a clean random access (CRA) picture or a broken link access (BLA) picture. In some cases, RAP pictures may alternatively be referred to as intra random access point (IRAP) pictures. For example, an alternative set of CPB parameters may be used when the HRD is initialized with a BLA picture that does not have associated non-decodable leading pictures, also referred to as tagged for discard (TFD) pictures or Random Access Skipped Leading (RASL) pictures, in the bitstream. Otherwise, the default set of CPB parameters is used for the HRD. If a default set of CPB parameters is used when the alternative set should have been selected, the CPB may overflow.

In some examples, a given CRA picture or BLA picture may have associated TFD pictures in an original bitstream and the TFD pictures may be removed from the original bitstream by an external means. The external means may comprise a processing means included in a streaming server, an intermediate network element, or another network entity. The external means, however, may be unable to change the signaled type of the given CRA picture or BLA picture to reflect the removal of the associated TFD pictures. In this case, the default set of CPB parameters may be selected based on the signaled type of the CRA picture or BLA picture in the original bitstream. This may result in a CPB overflow because the TFD pictures were removed by the external means such that the picture no longer has associated TFD pictures and the alternative set of CPB parameters should be used for the HRD.

This disclosure describes techniques for selection of CPB parameters used to define a CPB for video encoder 20 and/or video decoder 30 for CRA pictures or BLA pictures in a video bitstream. According to the techniques, video decoder 30 receives a bitstream representing a plurality of pictures including one or more CRA pictures or BLA pictures, and also receives a message indicating whether to use an alternative set of CPB parameters for at least one of the CRA pictures or the BLA pictures. The message may be received from an external means, such as a processing means included in a streaming server, an intermediate network element, or another network entity.

Video decoder 30 sets a variable defined to indicate the set of CPB parameters for a given one of the CRA pictures or the BLA pictures based on the received message. Video decoder 30 then selects the set of CPB parameters for the given one of the CRA pictures or the BLA pictures based on the variable for the picture. In some cases, the video decoder 30 may set a network abstraction layer (NAL) unit type for the given one of the CRA pictures or the BLA pictures, and may select the set of CPB parameters for the given picture based on the NAL unit type and the variable for the picture.

The selected set of CPB parameters is applied to a CPB included in video decoder 30 to ensure that the CPB will not overflow during video decoding. Video encoder 20 may be configured to perform a similar operation and apply the selected set of CPB parameters to a CPB included in video encoder 20 to ensure that the CPB included in video encoder 20 will not overflow during video encoding, and that the CPB included in video decoder 30 will not overflow upon receiving an encoded bitstream generated by video encoder 20.

Figure 2:
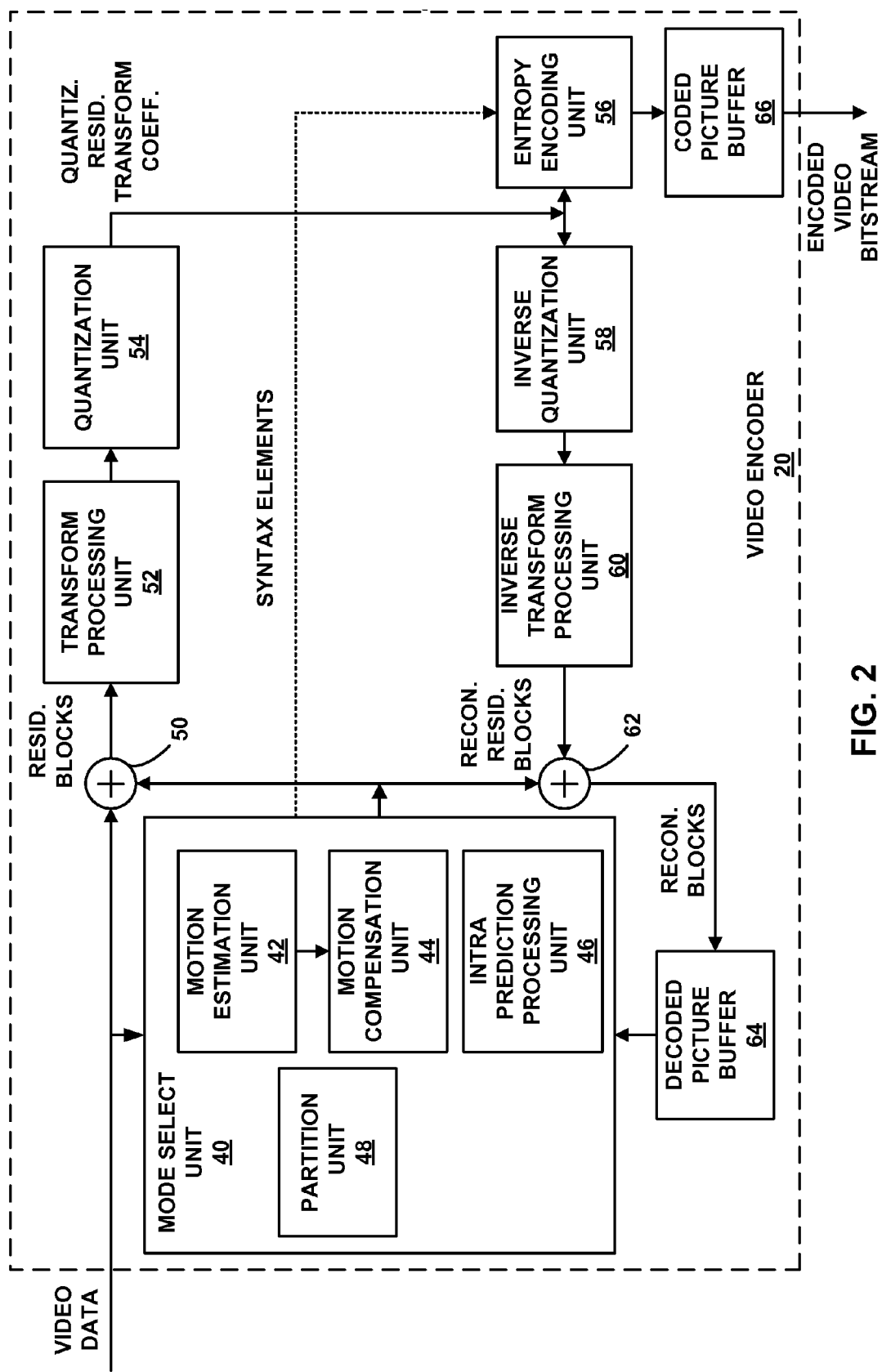
FIG. 2 is a block diagram illustrating an example video encoder that may implement the techniques described in this disclosure.

FIG. 2 is a block diagram illustrating an example of video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, summer 50, transform processing unit 52, quantization unit 54, entropy encoding unit 56, decoded picture buffer (DPB) 64 and coded picture buffer (CPB) 66. Mode select unit 40, in turn, includes motion compensation unit 44, motion estimation unit 42, intra-prediction processing unit 46, and partition unit 48. For video block reconstruction, video encoder 20 also includes inverse quantization unit 58, inverse transform processing unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction processing unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in DPB 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes.

For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction processing unit 46 may calculate ratios from the distortions and rates for the various encoded blocks to determine which intra-prediction mode exhibits the best rate-distortion value for the block.

After selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be buffered or stored more or less temporarily CPB 66, transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of DPB 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in DPB 64. The reconstructed video block may be used by motion estimation unit 42 and motion compensation unit 44 as a reference block to inter-code a block in a subsequent video frame.

DPB 64 may be or may be included in a data storage device, such as any permanent or volatile memory capable of storing data, such as synchronous dynamic random access memory (SDRAM), embedded dynamic random access memory (eDRAM), or static random access memory (SRAM). DPB 64 may operate according to any combination of example coded picture buffer and/or decoded picture buffer behaviors described in this disclosure. For example, video encoder 20 may be configured to operate according to a hypothetical reference decoder (HRD). In this case, DPB 64 included in video encoder 20 may be defined by HRD parameters, including CPB parameters and DPB parameters, in accordance with a buffering model of the HRD.

Similarly, CPB 66 may be or may be included in a data storage device such as any permanent or volatile memory capable of storing data, such as synchronous dynamic random access memory (SDRAM), embedded dynamic random access memory (eDRAM), or static random access memory (SRAM). Although shown as forming part of video encoder 20, in some examples, CPB 66 may form part of a device, unit, or module external to video encoder 20. For example, CPB 66 may form part of a stream scheduler unit, e.g., a delivery scheduler or a hypothetical stream scheduler (HSS) external to video encoder 20. In the case where video encoder 20 is configured to operate according to a HRD, CPB 66 included in video encoder 20 may be defined by HRD parameters, including the CPB parameters of initial CPB removal delay and offset, in accordance with a buffering model of the FEM.

According to the techniques of this disclosure, video encoder 20 may apply either a default set or an alternative set of CPB parameters to CPB 66 to ensure that CPB 66 does not overflow during encoding of the video data, and that a CPB included in video decoder 30 does not overflow upon receiving an encoded bitstream generated by video encoder 20. If the default set is used when the alternative set should have been selected, CPB 66 included in video encoder 20 or the CPB included in video decoder 30 may overflow. The selection of the appropriate CPB parameters is primarily a concern when a random access point (RAP) picture, such as a clean random access (CRA) picture or a broken link access (BLA) picture, is used to initialize the HRD. The techniques, therefore, may provide improved support of RAP pictures in video coding.

Video encoder 20 may be configured to receive a bitstream representing a plurality of pictures including one or more CRA pictures or BLA, pictures, and also receives a message indicating whether to use an alternative set of CPB parameters for at least one of the CRA pictures or the BLA pictures. In some cases, the bitstream may be received at a decoding portion of video encoder 20, i.e., inverse quantization unit 58 and inverse transform processing unit 60, directly from an encoding portion of video encoder 20, e.g., entropy encoding unit 56 or CPB 66. The message may be received from an external means, such as a processing means included in a streaming server, an intermediate network element, or another network entity.

Video encoder 20 sets a variable defined to indicate the set of CPB parameters for a given one of the CRA pictures or the BLA pictures based on the received message. Video encoder 20 then selects the set of CPB parameters for the given one of the CRA pictures or the BLA pictures based on the variable for the picture. Video encoder 20 applies the selected set of CPB parameters to CPB 66 included in video encoder 20 to ensure that CPB 66 will not overflow during video encoding, and to ensure that a CPB included in video decoder 30 will not overflow upon receiving an encoded bitstream generated by video encoder 20. In some cases, video encoder 20 may set a network abstraction layer (NAL) unit type for the given one of the CRA pictures or the BLA pictures, and may select the set of CPB parameters for the given picture based on the NAL unit type and the variable for the picture. The CPB parameter selection process for RAP pictures is described in more detail with respect to video decoder 30 of FIG. 3.

Figure 3:
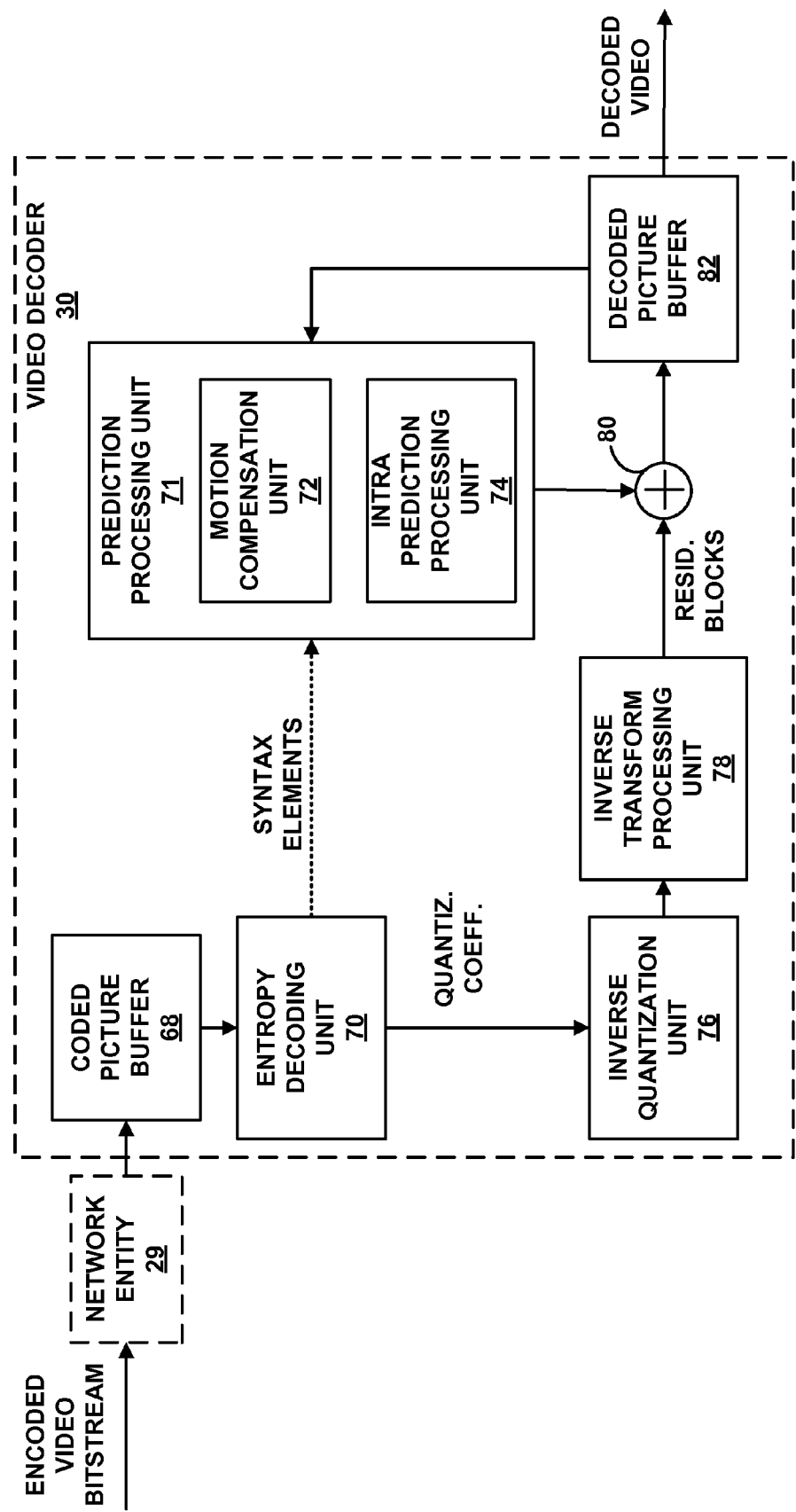
FIG. 3 is a block diagram illustrating an example video decoder that may implement the techniques described in this disclosure.

FIG. 3 is a block diagram illustrating an example of video decoder 30 that may implement the techniques described in this disclosure. In the example of FIG. 3, video decoder 30 includes an entropy decoding unit 70, prediction processing unit 71 including motion compensation unit 72 and intra prediction processing unit 74, inverse quantization unit 76, inverse transformation processing unit 78, summer 80, coded picture buffer (CPB) 68, and decoded picture buffer (DPB) 82. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Video decoder 30 may receive the encoded video bitstream from a network entity 29. Network entity 29 may; for example, be a streaming server, a media-aware network element (MANE), a video editor/splicer, an intermediate network element, or other such device configured to implement one or more of the techniques described above. Network entity 29 may include an external means configured to perform the techniques of this disclosure. As described above, some of the techniques described in this disclosure may be implemented by network entity 29 prior to network entity 29 transmitting the encoded video bitstream to video decoder 30. In some video decoding systems, network entity 29 and video decoder 30 may be parts of separate devices, while in other instances, the functionality described with respect to network entity 29 may be performed by the same device that comprises video decoder 30.

Prior to entropy decoding by entropy decoding unit 70, the bitstream may be buffered or stored more or less temporarily in CPB 68. Entropy decoding unit 70 of video decoder 30 then entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra prediction processing unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in DPB 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied. Inverse transform processing unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in DPB 82, which stores reference pictures used for subsequent motion compensation. DPB 82 also stores decoded video for later presentation on a display device, such as display device 32 of FIG. 1.

DPB 82 may be or may be included in a data storage device, such as any permanent or volatile memory capable of storing data, such as synchronous dynamic random access memory (SDRAM), embedded dynamic random access memory (eDRAM), or static random access memory (SRAM). DPB 82 may operate according to any combination of example coded picture buffer and/or decoded picture buffer behaviors described in this disclosure. For example, video decoder 30 may be configured to operate according to a hypothetical reference decoder (HRD). In this case, video decoder 30 may decode HRD parameters, including CPB parameters and DPB parameters, used to define DPB 82 in accordance with a buffering model of the HRD.

Similarly, CPB 68 may be or may be included in a data storage device such as any permanent or volatile memory capable of storing data, such as synchronous dynamic random access memory (SDRAM), embedded dynamic random access memory (eDRAM), or static random access memory (SRAM). Although shown as forming part of video decoder 30, in some examples, CPB 68 may form part of a device, unit, or module external to video decoder 30. For example, CPB 68 may form part of a stream scheduler unit, e.g., a delivery scheduler or a hypothetical stream scheduler MSS) external to video decoder 30. In the case where video decoder 30 is configured to operate according to a HRD, video decoder 30 may decode HRD parameters, including the CPB parameters of initial CPB removal delay and offset, used to define CPB 68 in accordance with a buffering model of the HRD.

According to the techniques of this disclosure, video decoder 30 may apply either a default set or an alternative set of CPB parameters to CPB 68 to ensure that CPB 68 does not overflow during decoding of the video data. If the default set is used when the alternative set should have been selected, CPB 68, included a video decoder 30 configured to operate according to the HRD, may overflow. The selection of the appropriate CPB parameters is primarily a concern when a random access point (RAP) picture, such as a clean random access (CRA) picture or a broken link access (BLA) picture, is used to initialize the HRD. The techniques, therefore, may provide improved support of RAP pictures in video coding.

Video decoder 30 receives a bitstream representing a plurality of pictures including one or more CRA pictures or BLA pictures, and also receives a message indicating whether to use an alternative set of CPB parameters for at least one of the CRA pictures or the BLA pictures. The message may be received from network entity 29 or another external means, such as a processing means included in a streaming server or an intermediate network element.

Video decoder 30 sets a variable defined to indicate the set of CPB parameters for a given one of the CRA pictures or the BLA pictures based on the received message. The video coding device then selects the set of CPB parameters for the given one of the CRA pictures or the BLA pictures based on the variable for the picture. Video decoder 30 applies the selected set of CPB parameters to CPB 68 to ensure that CPB 68 will not overflow during video decoding. In some cases, video decoder 30 may set a network abstraction layer (NAL) unit type for the given one of the CRA pictures or the BLA pictures. Video decoder 30 may set the NAL unit type for the picture as signaled, or may set the NAL unit type based on the variable for the picture. Video decoder 30 may then select the set of CPB parameters for the given picture based on the NAL unit type and the variable for the picture.

In general, this disclosure describes techniques to provide improved support of RAP pictures, including improved methods of selection of HRD parameters for RAP pictures, and handling of a CRA picture as a BLA picture. As described above, video coding standards include ITU-T H.261, ISO/IEC MPEG-1 Visual, ITU-T H.262 or ISO/IEC MPEG-2 Visual, ITU-T H.263, ISO/11.0 MPEG-4 Visual and ITU-T H.264 (also known as ISO/IEC MPEG-4 AVC), including its Scalable Video Coding (SVC) and Multiview Video Coding (MVC) extensions. In addition, there is a new video coding standard, namely High-Efficiency Video Coding (HEVC), being developed by the Joint Collaboration Team on Video Coding JCT-VC) of ITU-T Video Coding Experts Group (VCEG) and ISO/IEC Motion Picture Experts Group (MPEG). A recent Working Draft (WD) of HEVC (hereafter referred to as HEVC WD8) is described in document JCTVC-J1003_d7, Bross et al., "High Efficiency Video Coding (HEVC) Text Specification Draft 8," Joint Collaborative Team on Video Coding (JCT-VC) of ITU-T SG16 WP3 and ISO/IEC JTC1/SC29/WG11, $10^{th}$ Meeting: Stockholm, Sweden, 11-20 Jul. 2012, which, as of 20 Sep. 2012, is available from http://phenix.int-evry.fr/jct/doc_end_user/documents/10_Stockholm/wg11/JCTVC-J1003-v8.zip.

Random access refers to a decoding of a video bitstream starting from a coded picture that is not the first coded picture in the bitstream. Random access to a bitstream is needed in many video applications, such as broadcasting and streaming, e.g., for users to tune-in to a program anytime, to switch between different channels, to jump to specific parts of the video, or to switch to a different bitstream for stream adaptation of the bit rate, frame rate, spatial resolution, and the like. This feature is enabled by inserting random access pictures or random access points many times in regular intervals, into the video bitstream.

Bitstream splicing refers to the concatenation of two or more bitstreams or parts thereof. For example, a first bitstream may be appended by a second bitstream, possibly with some modifications to either one or both of the bitstreams to generate a spliced bitstream. The first coded picture in the second bitstream is also referred to as the splicing point. Therefore, pictures after the splicing point in the spliced bitstream were originated from the second bitstream while pictures preceding the splicing point in the spliced bitstream were originated from the first bitstream.

Splicing of bitstreams is performed by bitstream splicers. Bitstream splicers are often lightweight and much less intelligent than encoders. For example, they may not be equipped with entropy decoding and encoding capabilities. Bitstream switching may be used in adaptive streaming environments. A bitstream switching operation at a certain picture in the switched-to bitstream is effectively a bitstream splicing operation wherein the splicing point is the bitstream switching point, i.e., the first picture from the switched-to bitstream.

Instantaneous decoding refresh (IDR) pictures as specified in AVC or HEVC can be used for random access. However, since pictures following an IDR picture in decoding order cannot use pictures decoded prior to the IDR picture as reference, bitstreams relying on IDR pictures for random access can have significantly lower coding efficiency. To improve coding efficiency, the concept of clean random access (CRA) pictures was introduced in HEVC to allow pictures that follow a CRA picture in decoding order but precede it in output order to use pictures decoded before the CRA picture as reference pictures.

Pictures that follow a CRA picture in decoding order but precede the CRA picture in output order are referred to as leading pictures associated with the CRA picture or leading pictures of the CRA picture. The leading pictures of a CRA picture are correctly decodable if the decoding starts from an IDR or CRA picture before the current CRA picture. The leading pictures of a CRA picture may be non-decodable when random access from the current CRA picture occurs. The leading pictures, therefore, are typically discarded during random access decoding. To prevent error propagation from reference pictures that may not be available depending on where the decoding starts, all pictures that follow a CRA picture both in decoding order and output order should not use any picture that precedes the CRA picture either in decoding order or output order, which includes the leading pictures, as reference pictures.

The concept of broken link access (BLA) pictures was further introduced in HEVC after the introduction of CRA pictures and is based on the concept of CRA pictures. A BLA picture typically originates from bitstream splicing at the position of a CRA picture and, in the spliced bitstream, the splicing point CRA picture is changed to a BLA picture. DR pictures, CRA pictures and BLA pictures are collectively referred to as random access point (RAP) pictures or intra random access point (RAP) pictures.

A discussion of the major differences between BLA pictures and CRA pictures follows. For a CRA picture, the associated leading pictures are correctly decodable if the decoding starts from a RAP picture before the CRA picture in decoding order, and may be non-correctly decodable when random access from the CRA picture occurs (i.e., when the decoding starts from the CRA picture, or in other words, when the CRA picture is the first picture in the bitstream). For a BLA picture, the associated leading pictures may be non-decodable in all cases, even when the decoding starts from a RAP picture before the BLA picture in decoding order.

For a particular CRA or BLA picture, some of the associated leading pictures are correctly decodable even when the CRA or BLA picture is the first picture in the bitstream. These leading pictures are referred to as decodable leading pictures (DLPs), and other leading pictures are referred to as non-decodable leading pictures (NLPs). In some cases, DLPs may alternatively be referred to as Random Access Decodable Leading (RAIN) pictures. NLPs are referred to as tagged for discard (TFD) pictures in HEVC WD8. In other cases, NLPs may alternatively be referred to as Random Access Skipped Leading (RASL) pictures. For purposes of this disclosure, the terms "non-decodable leading pictures," "TFD pictures," and "RASL pictures" may be used interchangeably.

In HEVC WD8, the hypothetical reference decoder (HRD) is specified in Annex C. The HRD relies on the HRD parameters, which can be provided in the bitstream in the hrd_parameters( ) syntax structure included in the video parameter set (VPS) and/or the sequence parameter set (SPS), the buffering period supplemental enhancement information (SEI) messages, and the picture timing SEI message. The buffering period SEI message mainly includes CPB parameters, namely initial coded picture buffer (CPB) removal delays and initial CPB removal delay offsets. Two sets of CPB parameters can be provided, referred to as the default set signaled by the syntax elements initial_cpb_removal_delay[ ] and initial_cpb_removal_delay_offset[ ], and the alternative set, signaled by the syntax elements initial_alt_cpb_removal_delay[ ] and initial_alt_cpb_removal_delay_offset[ ].

When sub_pic_cpb_params_present_flag is equal to 0, and rap_cpb_params_present_flag is equal to 1, the following applies. Video decoder 30 uses the alternative set of CPB parameters to define CPB 68 when the HRD is initialized with a BLA picture that does not have associated TFD pictures in the bitstream. A BLA picture that does not have associated non-decodable leading pictures has a nal_unit_type that indicates a BLA picture with decodable leading pictures, e.g., BLA_W_DLP, or indicates a BLA picture with no leading pictures, e.g., BLA_N_LP. If instead the default set is used, the CPB may overflow. When the HRD is initialized with a CRA picture or a BLA picture that has associated TFD pictures, video decoder 30 uses the default set of CPB parameters to define CPB 68. A BLA picture that has associated TFD pictures has a nal_unit_type that indicates a BLA picture with non-decodable leading pictures, e.g., BLA_W_TFD. This is reflected in the following text in subclause C.2.1 of HEVC WD8:

The variables InitCpbRemovalDelay[SchedSelIdx] and InitCpbRemovalDelayOffset[SchedSelIdx] are set as follows,
If either of the following conditions is true, InitCpbRemovalDelay[SchedSelIdx] and InitCpbRemovalDelayOffset[SchedSelIdx] are set to the values of the corresponding initial_alt_cpb_removal_delay[SchedSelIdx] and initial_alt_cpb_removal_delay_offset[SchedSelIdx], respectively, of the associated buffering period SEI message:
Access unit 0 is a BLA access unit for which the coded picture has nal_unit_type equal to BLA_W_DLP or BLA_N_LP, and the value of rap_cpb_params_present_flag of the associated buffering period SEI message is equal to 1;
SubPicCpbFlag is equal to 1.
Otherwise, InitCpbRemovalDelay[SchedSelIdx] and InitCpbRemovalDelayOffset[SchedSelIdx] are set to the values of the corresponding initial_cpb_removal_delay[SchedSelIdx] and initial_cpb_removal_delay_offset[SchedSelIdx], respectively, of the associated buffering period SEI message.

As can be seen from above, selection of which set of CPB parameters to use for a given picture may be based on the value of nal_unit_type of the picture.

HEVC WD8 also includes the following text in subclause 8.1 for handling of a CRA picture as a BLA picture.
When the current picture is a CRA picture, the following applies,
If some external means not specified in this Specification is available to set the variable HandleCraAsBlaFlag to a value, HandleCraAsBlaFlag is set to the value provided by the external means,
Otherwise, the value of HandleCraAsBlaFlag is set to 0.
When HandleCraAsBlaflag is equal to 1, the following applies during the parsing and decoding processes for each coded slice NAL unit:
The value of nal_unit_type is set to BLA_W_TFD.
The value of no_output_of_prior_pics_flag is set to 1.

In HEVC WD8, a CRA picture has nal_unit_type equal to CRA_NUT in the NAL unit header of its coded slices, and it may have associated TFD pictures and DLP pictures.

The following issues are associated with existing methods for selection of CPB parameters for CRA pictures, BLA pictures, and CRA pictures handled as BLA pictures. The first issue is associated with selection of CPB parameters for CRA pictures and BLA pictures. CRA pictures may have associated TFD pictures. When a CRA picture has associated TFD pictures in the original bitstream, but the associated TFD pictures are discarded by a streaming server or an intermediate network element, in order to enable selection of the appropriate set of CPB parameters, i.e., the alternative set, network entity 29 or another external means must change the CRA picture to a BLA picture before sending it to video decoder 30. However, network entity 29 may not be capable of doing this. In such situations, either selection of the appropriate set of initial CPB removal delay and offset cannot be successful, which may result in overflow of CPB 68, or discarding of the TFD pictures cannot be performed, which results in waste of bandwidth or lower video quality.

The second issue is associated with handling of a CRA picture as a BLA picture, CRA pictures may have associated TFD pictures. When a CRA picture has associated TFD pictures in the original bitstream, but the associated TFD pictures are discarded by network entity 29 or another external means, such as a processing means included in the streaming server or an intermediate network element, the external means indicates to handle the CRA picture as a BLA picture. As specified in HEVC WD8, video decoder 30 then sets the value of a nal_unit_type to indicate a BLA picture with non-decodable leading pictures, e.g., BLA_W_TFD, which results in the use of the default set of CPB parameters and consequently CPB 68 may overflow.

The techniques of this disclosure provide improved RAP picture behaviors capable of eliminating or avoiding the issues described above. According to the techniques, variables are defined, and the values of the variables may be set by network entity 29 or another external means, such as a processing means included in the streaming server, the intermediate network element, or another network entity, out of the scope of the video coding specification. In one example, a variable may specify whether an alternative set of CPB parameters is used, and which NAL unit type is used when a CRA picture is handled as a BLA picture. In another example, a variable may specify the NAL unit type value to be used for a particular picture, from which it may be derived whether the default or the alternative set of CPB parameters is used.

In the following sections, the above mentioned techniques are described in greater detail. Underlines may indicate additions relative to HEVC WD8 and strikethroughs may indicate deletions relative to HEVC WD8.

In one example, video decoder 30 receives a bitstream representing a plurality of pictures including one or more CRA pictures or BLA pictures. Video decoder 30 also receives a message from network entity 29 indicating whether to use an alternative out of CPB parameters for at least one of the CRA pictures or the BLA pictures. Video decoder 30 sets a variable defined to indicate the set of CPB parameters for a given one of the CRA pictures or the BLA pictures based on the received message. Video decoder 30 then selects the set of CPB parameters for the given one of the CRA pictures or the BLA pictures based on the variable for the picture.

According to this example, a variable UseAltCpbParamsFlag may be defined for each BLA or CRA picture. The value of this variable is set by network entity 29 or some other external means to either 0 or 1. If such an external means is not available, video decoder 30 may set the value of the variable to 0.

In this case, the text in subclause 8.1 of HEVC WD8, which is quoted above, may be replaced with the following:

When the current picture is a BLA picture that has nal_unit_type equal to BLA_W_TFD or is a CRA_picture, the following applies.
  If some external means not specified in this Specification is available to set the variable UseAltCpbParamsFlag to a value, UseAltCpbParamsFlag is set to the value provided by the external means.
  Otherwise, the value of UseAltCpbParamsFlag is set to 0.
When the current picture is a CRA picture, the following applies.
  If some external means not specified in this Specification is available to set the variable HandleCraAsBlaFlag to a value, HandleCraAsBlaFlag is set to the value provided by the external means.
  Otherwise, the value of HandleCraAsBlaFlag is set to 0.
When the current picture is a CRA picture and HandleCraAsBlaFlag is equal to 1, the following applies during the parsing and decoding processes for each coded slice NAL unit, and the CRA picture is considered as a BLA picture and the CRA access unit is considered as a BLA access unit:
  If UseAltCpbParamsFlag is equal to 0, the value of nal_unit_type is set to BLA_W_TFD. Otherwise, the value of nal_unit_type is set to BLA_W_DLP.
  The value of no_output_of_prior_pics_flag is set to 1.

In addition, the text in subclause C.2.1 of HEVC WD8, quoted above may be replaced with the following:
  The variables InitCpbRemovalDelay[SchedSelIdx] and InitCpbRemovalDelayOffset[SchedSelIdx] are set as follows.

If one of the following conditions is true, InitCpbRemovalDelay[SchedSelIdx] and InitCpbRemovalDelayOffset[SchedSelIdx] are set to the values of the corresponding initial_alt_cpb_removal_delay[SchedSelIdx] and initial_alt_cpb_removal_delay_offset[SchedSelIdx], respectively, of the associated buffering period SEI message:
  Access unit 0 is a BLA access unit for which the coded picture has nal_unit_type equal to BLA_W_DLP or BLA_N_LP, and the value of rap_cpb_params_present_flag of the associated buffering period SEI message is equal to 1;
  Access unit 0 is a BLA access unit for which the coded picture has nal_unit_type equal to BLA_W_TFD or is a CRA access unit, UseAltCpbParamsFlag is equal to 1, and the value of rap_cpb_params_present_flag of the associated buffering period SEI message is equal to 1;
  SubPicCpbFlag is equal to 1.
  Otherwise, InitCpbRemovalDelay[SchedSelIdx] and InitCpbRemovalDelayOffset[SchedSelIdx] are set to the values of the corresponding initial_cpb_removal_delay[SchedSelIdx] and initial_cpb_removal_delay_offset[SchedSelIdx], respectively, of the associated buffering period SEI message.

Network entity 29 or another external means configured to set the value of UseAltCpbParamsFlag may work as follows. Network entity 29 may send a message to a video decoder 30 or to a receiver containing video decoder 30. The message may indicate that, for a particular BLA or CRA picture, it had associated TFD pictures but the associated TFD pictures were discarded, and thus the alternative set of CPB parameters should be used. Upon receiving such a message, video decoder 30 may set the value of UseAltCpbParamsFlag for the particular BLA or CRA picture to 1. If the particular BLA or CRA did not have TFD pictures, or it had TFD pictures that were not discarded, then no message needs to be sent or a message is sent to instruct video decoder 30 to set the value of UseAltCpbParamsFlag for the particular BLA or CRA picture to 0.

In some cases, video decoder 30 may set a network abstraction layer (NAL) unit type for the given one of the CRA pictures or the BLA pictures, and may select the set of CPB parameters for the given picture based on the NAL unit type and the variable for the picture. As a further example, instead of using only one NAL unit type that indicates a general CRA picture, e.g., CRA_NUT, the techniques of this disclosure enable the use of three different NAL unit types that respectively indicate a CRA picture with non-decodable leading pictures, e.g., CRA_W_TFD, indicate a CRA picture with decodable leading pictures, e.g., CRA_W_DLP, and indicate a CRA picture with no leading pictures, e.g., CRA_N_LP. In this case, Table 7-1 in HEVC WD8 and the notes below the table are changed as shown below.

TABLE 7-1

NAL unit type codes and NAL unit type classes

| nal_unit_type | Name of nal_unit_type | Content of NAL unit and RBSP syntax structure | NAL unit type class |
|---|---|---|---|
| 0 | UNSPEC0 | Unspecified | non-VCL |
| 1, 2 | TRAIL_R, TRAIL_N | Coded slice of a non-TSA, non-STSA trailing picture slice_layer_rbsp( ) | VCL |

TABLE 7-1-continued

NAL unit type codes and NAL unit type classes

| nal_unit_type | Name of nal_unit_type | Content of NAL unit and RBSP syntax structure | NAL unit type class |
|---|---|---|---|
| 3, 4 | TSA_R, TSA_N | Coded slice of a TSA picture slice_layer_rbsp( ) | VCL |
| 5, 6 | STSA_R, STSA_N | Coded slice of an STSA picture slice_layer_rbsp( ) | VCL |
| 7, 8, 9 | BLA_W_TFD BLA_W_DLP BLA_N_LP | Coded slice of a BLA picture slice_layer_rbsp( ) | VCL |
| 10, 11 | IDR_W_LP IDR_N_LP | Coded slice of an IDR picture slice_layer_rbsp( ) | VCL |
| 12, 13, 14 | CRA_W_TFD CRA_W_DLP CRA_N_LP | Coded slice of a CRA picture slice_layer_rbsp( ) | VCL |
| 15 | DLP_NUT | Coded slice of a DLP picture slice_layer_rbsp( ) | VCL |
| 16 | TFD_NUT | Coded slice of a TFD picture slice_layer_rbsp( ) | VCL |
| 17 ... 22 | RSV_VCL17 ... RSV_VCL22 | Reserved | VCL |
| 23 ... 24 | RSV_NVCL23 ... RSV_NVCL24 | Reserved | non-VCL |
| 25 | VPS_NUT | Video parameter set video_parameter_set_rbsp( ) | non-VCL |
| 26 | SPS_NUT | Sequence parameter set seq_parameter_set_rbsp( ) | non-VCL |
| 27 | PPS_NUT | Picture parameter set pic_parameter_set_rbsp( ) | non-VCL |
| 28 | AUD_NUT | Access unit delimiter access_unit_delimiter_rbsp( ) | non-VCL |
| 29 | EOS_NUT | End of sequence end_of_seq_rbsp( ) | non-VCL |
| 30 | EOB_NUT | End of bitsteam end_of_bitstream_rbsp( ) | non-VCL |
| 31 | FD_NUT | Filler data filler_data_rbsp( ) | non-VCL |
| 32 | SEI_NUT | Supplemental enhancement information (SEI) sei_rbsp( ) | non-VCL |
| 33 ... 47 | RSV_NVCL33 ... RSV_NVCL47 | Reserved | non-VCL |
| 48 ... 63 | UNSPEC48 ... USPEC63 | Unspecified | non-VCL |

NOTE 3—A CRA picture having nal_unit_type equal to CRA_W_TFD may have associated TFD pictures, or associated DLP pictures, or both present in the bitstream. A CRA picture having nal_unit_type equal to CRA_W_DLP does not have associated TFD pictures present in the bitstream, but may have associated DLP pictures in the bitstream. A CRA picture having nal_unit_type equal to CRA_N_LP does not have associated leading pictures present in the bitstream.

NOTE 4—A BLA picture having nal_unit_type equal to BLA_W_TFD may have associated TFD pictures, or associated DLP pictures, or both present in the bitstream. A BLA picture having nal_unit_type equal to BLA_W_DLP does not have associated TFD pictures present in the bitstream, but may have associated DLP pictures in the bitstream. A BLA picture having nal_unit_type equal to BLA_N_LP does not have associated leading pictures present in the bitstream.

NOTE 5—An IDR picture having nal_unit_type equal to IDR_N_LP does not have associated leading pictures present in the bitstream. An IDR picture having nal_unit_type equal to IDR_W_DLP does not have associated TFD pictures present in the bitstream, but may have associated DLP pictures in the bitstream.

In addition, similar to the first example described above, a variable UseAltCpbParamsFlag is defined for each BLA or CRA picture. The value of this variable is set by network entity 29, or another external means, to either 0 or 1. If such an external means is not available, video decoder 30 may set the value of the variable to 0.

In this case, the text in subclause 8.1 of HEVC WD8, quoted above, may be replaced with the following:

When the current picture is a BLA picture that has nal_unit_type equal to BLA_W_TFD or is a CRA picture that has nal_unit_type equal to CRA_W_TFD, the following applies.
  If some external means not specified in this Specification is available to set the variable UseAltCpbParamsFlag to a value, UseAltCpbParamsFlag is set to the value provided by the external means.
  Otherwise, the value of UseAltCpbParamsFlag is set to 0.

When the current picture is a CRA picture, the following applies.
  If some external means not specified in this Specification is available to set the variable HandleCraAsBlaFlag to a value, HandleCraAsBlaFlag is set to the value provided by the external means.
  Otherwise, the value of HandleCraAsBlaFlag is set to 0.

When the current picture is a CRA picture and HandleCraAsBlaFlag is equal to 1, the following applies during the parsing and decoding processes for each coded slice NAL unit, and the CRA picture is considered as a BLA picture and the CRA access unit is considered as a BLA access unit:

If the value of nal_unit_type equal to CRA_W_TFD, the value of nal_unit_type is set to BLA_W_TFD. Otherwise, if the value of nal_unit_type equal to CRA_W_DLP, the value of nal_unit_type is set to BLA_W_DLP. Otherwise, the value of nal_unit_type is set to BLA_N_LP.

The value of no_output_of_prior_pics_flag is set to 1.

In addition, the text in subclause C.2.1 of HEVC WD8, quoted above, may be replace with the following:

The variables InitCpbRemovalDelay[SchedSelIdx] and InitCpbRemovalDelayOffset[SchedSelIdx] are set as follows.

If one of the following conditions is true, InitCpbRemovalDelay[SchedSelIdx] and InitCpbRemovalDelayOffset[SchedSelIdx] are set to the values of the corresponding initial_alt_cpb_removal_delay [SchedSelIdx] and initial_alt_cpb_removal_delay_offset[SchedSelIdx], respectively, of the associated buffering period SEI message:

Access unit 0 is a BLA access unit for which the coded picture has nal_unit_type equal to BLA_W_DLP or BLA_N_LP, and the value of rap_cpb_params_present_flag of the associated buffering period SEI message is equal to 1;

Access unit 0 is a CRA access unit for which the coded picture has nal_unit_type equal to CRA_W_DLP or CRA_N_LP, and the value of rap_cpb_params_present_flag of the associated buffering period SEI message is equal to 1;

Access unit 0 is a BLA access unit for which the coded picture has nal_unit_type equal to BLA_W_TFD or is a CRA access unit for which the coded picture has nal_unit_type equal to CRA_W_TFD, UseAltCpbParamsFlag is equal to 1, and the value of rap_cpb_params_present_flag of the associated buffering period SEI message is equal to 1;

SubPicCpbFlag is equal to 1.

Otherwise, InitCpbRemovalDelay[SchedSelIdx] and InitCpbRemovalDelayOffset[SchedSelIdx] are set to the values of the corresponding initial_cpb_removal_delay[SchedSelIdx] and initial_cpb_removal_delay_offset[SchedSelIdx], respectively, of the associated buffering period SEI message.

Network entity 29 or another external means configured to set the value of UseAltCpbParamsFlag may work as follows. Network entity 29 may send a message to video decoder 30 or a receiver containing video decoder 30. The message may indicate that, for a particular BLA or CRA picture, it had associated TFD pictures but the associated TFD pictures were discarded, and thus the alternative set of CPB parameters should be used. Upon receiving of such a message, video decoder 30 may set the value of UseAltCpbParamsFlag for the particular BLA or CRA picture to 1. If the particular BLA or CRA did not have TFD pictures, or it had TFD picture but not discarded, then no message needs to be sent or a message is sent to instruct video decoder 30 to set the value of UseAltCpbParamsFlag for the particular BLA or CRA picture to 0.

In another example, video decoder 30 receives a bitstream representing a plurality of pictures including one or more CRA pictures or BLA pictures, and also receives a message from network entity 29 indicating a NAL unit type for at least one of the CRA pictures or the BLA pictures. Video decoder 30 sets a variable defined to indicate the NAL unit type for a given one of the CRA pictures or the BLA pictures based on the received message. Video decoder 30 then sets the NAL unit type tier the given one of the CRA pictures or the BLA pictures, and selects the set of CPB parameters for the given picture based on the NAL unit type.

According to this example, a variable UseThisNalUnitType may be defined for each CRA or BLA picture. The value of this variable is set by network entity 29 or some other external means. If such an external means is not available, video decoder 30 may set the value of the variable to nal_unit_type of the CRA or BLA picture. In some examples, possible values for this variable are CRA_NUT, BLA_W_TFD, BLA_W_DLP and BLA_N_LP. In other examples, possible values of this variable may include other nal_unit_types configured to indicate a general CRA picture, a BLA picture with non-decodable leading pictures, a BLA picture with decodable leading pictures, and a BLA picture with no leading pictures.

In this case, the text in subclause 8.1 of HEVC WD8, which is quoted above, may be replaced with the following:

When the current picture is a BLA or CRA picture, the following applies.

If some external means not specified in this Specification is available to set the variable UseThisNalUnitType to a value, UseThisNalUnitType is set to the value provided by the external means. For a BLA picture with nal_unit_type equal to BLA_N_LP, the external means may only set UseThisNalUnitType to BLA_N_LP; for a BLA picture with nal_unit_type equal to BLA_W_DLP, the external means may only set UseThisNalUnitType to either BLA_W_DLP or BLA_N_LP; for a BLA picture with nal_unit_type equal to BLA_W_TFD, the external means may only set UseThisNalUnitType to one of BLA_W_TFD, BLA_W_DLP and BLA_N_LP; for a BLA picture, the external means shall never set UseThisNalUnitType to indicate a CRA picture or any other picture type; for a CRA picture, the external means may set UseThisNalUnitType to one of CRA_NUT, BLA_W_TFD, BLA_W_DLP and BLA_N_LP, not any other value.

Otherwise, the value of UseThisNalUnitType is set to nal_unit_type of the current picture.

When the current picture is a CRA or BLA picture, the following applies during the parsing and decoding processes for each coded slice NAL unit:

The value of nal_unit_type is set to UseThisNalUnitType, and the current picture or access unit is considered as a CRA or BLA picture or access unit according to the value of nal_unit_type equal to UseThisNalUnitType.

The value of no_output_of_prior_pics_flag is set to 1 if the current picture was a CRA picture before the above step and has become a BLA picture.

The text in subclause C.2.1 of HEVC WD8, which is quoted above, does not need to be changed.

As a further example, instead of using only one NAL unit type that indicates a general CRA picture, e.g., CRA_NUT, the techniques of this disclosure enable the use of three different NAL unit types that respectively indicate a CRA picture with non-decodable leading pictures, e.g., CRA_W_TFD, indicate a CRA picture with decodable leading pictures, e.g., CRA_W_DLP, and indicate a CRA picture with no leading pictures, e.g., CRA_N_LP. In this case, Table 7-1 in HEVC WD8 and the notes below the table are changed as described above.

In addition, similar to the second example described above, a variable UseThisNalUnitType is defined for each CRA or BLA picture. The value of this variable is set by network entity 29 or another external means. If such an external means is not available, video decoder 30 may set the value of the variable to nal_unit_type of the CRA or BLA picture. In some examples, possible values for this variable are CRA_W_TFD, CRA_W_DLP, CRA_N_LP, BLA_W_TFD, BLA_W_DLP and BLA_N_LP. In other examples, possible values of this variable may include other nal_unit_types configured to indicate a CRA picture with non-decodable leading pictures, a CRA picture with decodable leading pictures, a CRA picture with no leading pictures, a BLA picture with non-decodable leading pictures, a BLA picture with decodable leading pictures, and a BLA picture with no leading pictures.

In this case, the text in subclause 8.1 of HEVC WD8, quoted above, may be replaced with the following:

When the current picture is a BLA or CRA picture, the following applies.

If some external means not specified in this Specification is available to set the variable UseThisNalUnitType to a value, UseThisNalUnitType is set to the value provided by the external means, For a BLA picture with nal_unit_type equal to BLA_N_LP, the external means may only set UseThisNalUnitType to BLA_N_LP; for a BLA picture with nal_unit_type equal to BLA_W_DLP, the external means may only set UseThisNalUnitType to either BLA_W_DLP or BLA_N_LP; for a BLA picture with nal_unit_type equal to BLA_W_TFD, the external means may only set UseThisNalUnitType to one of BLA_W_TFD, BLA_W_DLP and BLA_N_LP; for a BLA picture, the external means shall never set UseThisNalUnitType to indicate a CRA picture or any other picture type.

For a CRA picture with nal_unit_type equal to CRA_N_LP, the external means may only set UseThisNalUnitType to CRA_N_LP or BLA_N_LP; for a CRA picture with nal_unit_type equal to CRA_W_DLP; the external means may only set UseThisNalUnitType to CRA_W_DLP, CRA_N_LP, BLA_W_DLP or BLA_N_LP; for a CRA picture with nal_unit_type equal to CRA_W_TFD, the external means may only set UseThisNalUnitType to CRA_W_TFD, CRA_W_DLP, CRA_N_LP, BLA_W_TFD, BLA_W_DLP or BLA_N_LP.

Otherwise, the value of UseThisNalUnitType is set to nal_unit_type of the current picture.

When the current picture is a CRA or BLA picture, the following applies during the parsing and decoding processes for each coded slice NAL unit:

The value of nal_unit_type is set to UseThisNalUnitType, and the current picture or access unit is considered as a CRA or BLA picture or access unit according to the value of nal_unit_type equal to UseThisNalUnitType.

The value of no_output_of_prior_pics_flag is set to 1 if the current picture was a CRA picture before the above step and has become BLA picture.

In addition, the text in subclause C.2.1 of HEVC WD8, quoted above, may be replaced with the following:

The variables InitCpbRemovalDelay[SchedSelIdx] and InitCpbRemovalDelayOffset[SchedSelIdx] are set as follows.

If one of the following conditions is true, InitCpbRemovalDelay[SchedSelIdx] and InitCpbRemovalDelayOffset[SchedSelIdx] are set to the values of the corresponding initial_alt_cpb_removal_delay[SchedSelIdx] and initial_alt_cpb_removal_delay_offset[SchedSelIdx], respectively, of the associated buffering period SEI message:

Access unit 0 is a BLA access unit for which the coded picture has nal_unit_type equal to BLA_W_DLP or BLA_N_LP, and the value of rap_cpb_params_present_flag of the associated buffering period SEI message is equal to 1;

Access unit 0 is a CRA access unit for which the coded picture has nal_unit_type equal to CRA_W_DLP or CRA_N_LP, and the value of rap_cpb_params_present_flag of the associated buffering period SEI message is equal to 1;

SubPicCpbFlag is equal to 1.

Otherwise, InitCpbRemovalDelay[SchedSelIdx] and InitCpbRemovalDelayOffset[SchedSelIdx] are set to the values of the corresponding initial_cpb_removal_delay[SchedSelIdx] and initial_cpb_removal_delay_offset[SchedSelIdx], respectively, of the associated buffering period SEI message.

Figure 4:
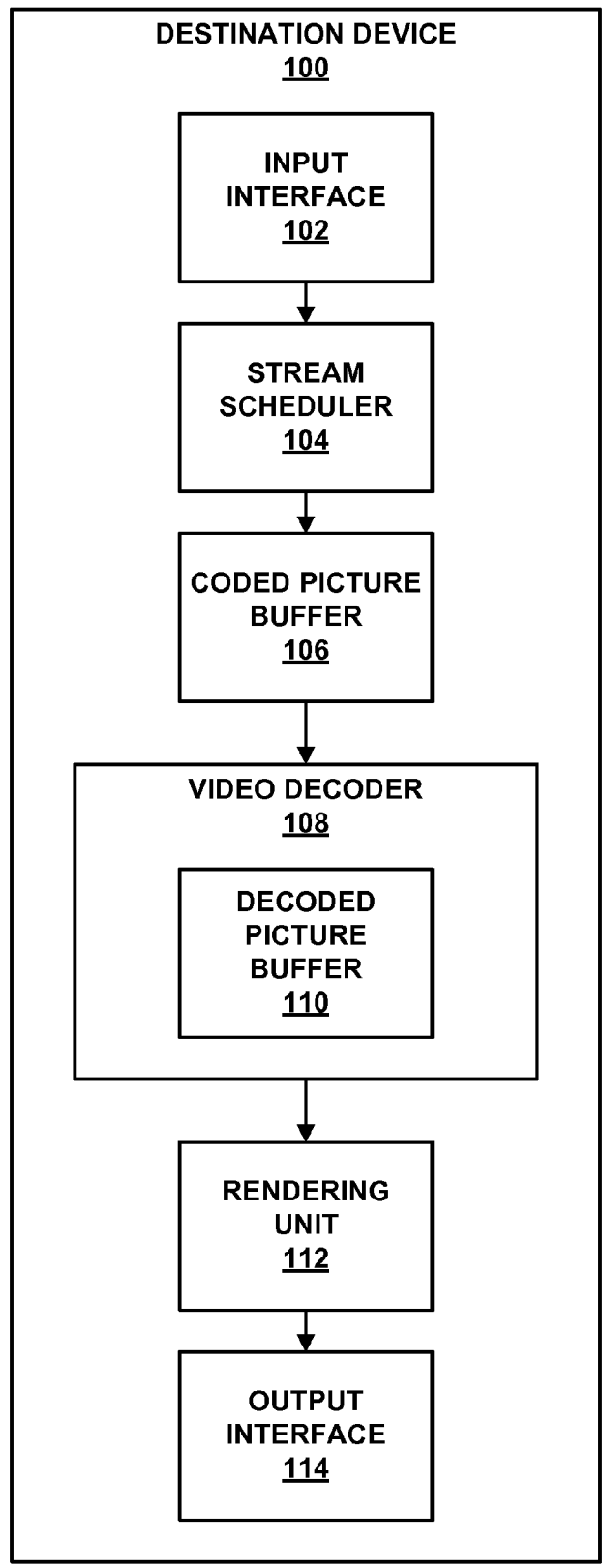
FIG. 4 is a block diagram illustrating an example destination device configured to operate according to a hypothetical reference decoder (HRD).

FIG. 4 is a block diagram illustrating an example destination device 100 configured to operate according to a hypothetical reference decoder (HRD). In this example, destination device 100 includes input interface 102, stream scheduler 104, coded picture buffer (CPB) 106, video decoder 108, decoded picture buffer (DPB) 110, rendering unit 112, and output interface 114. Destination device 100 may correspond substantially to destination device 14 from FIG. 1. Input interface 102 may comprise any input interface capable of receiving a coded bitstream of video data and may correspond substantially to input interface 28 from FIG. 1. For example, input interface 102 may comprise a receiver, a modem, a network interface, such as a wired or wireless interface, a memory or memory interface, a drive for reading data from a disc, such as an optical drive interface or magnetic media interface, or other interface component.

Input interface 102 may receive a coded bitstream including video data and provide the bitstream to stream scheduler 104. Stream scheduler 104 extracts units of video data, such as access units and/or decoding units, from the bitstream and stores the extracted units to CPB 106. In this manner, stream scheduler 104 represents an example implementation of a hypothetical stream scheduler (HSS). CPB 106 may conform substantially to CPB 68 from FIG. 3, except that as shown in FIG. 4, CPB 106 is separate from video decoder 108. CPB 106 may be separate from or integrated as part of video decoder 108 in different examples.

Video decoder 108 includes DPB 110. Video decoder 108 may conform substantially to video decoder 30 from FIGS. 1 and 3. DPB 110 may conform substantially to DPB 82 from FIG. 3. Thus, video decoder 108 may decode decoding units of CPB 106. Moreover, video decoder 108 may output decoded pictures from DPB 110. Video decoder 108 may pass output pictures to rendering unit 112. Rendering unit 112 may crop pictures and then pass the cropped pictures to output interface 114. Output interface 114, in turn, may provide the cropped pictures to a display device, which may conform substantially to display device 32 from FIG. 1.

The display device may form part of destination device 100, or may be communicatively coupled to destination device 100. For example, the display device may comprise a screen, touchscreen, projector, or other display unit integrated with destination device 100, or may comprise a separate display such as a television, monitor, projector, touchscreen, or other device that is communicatively coupled to destination device 100. The communicative coupling may comprise a wired or wireless coupling, such as by a coaxial cable, composite video cable, component video cable, a High-Definition Multimedia Interface (HDMI) cable, a radio-frequency broadcast, or other wired or wireless coupling.

Figure 5:
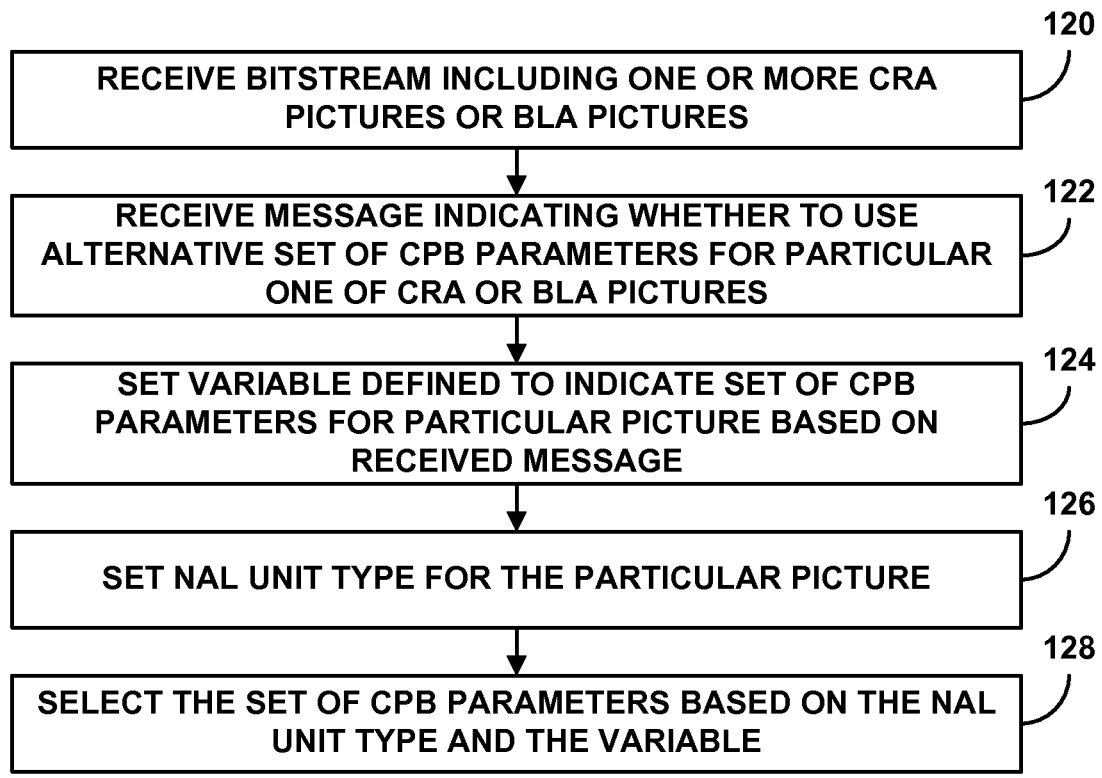
FIG. 5 is a flowchart illustrating an example operation of selecting a set of coded picture buffer (CPB) parameters based on a variable that indicates the set of CPB parameters for a particular random access point (RAP) picture in a bitstream.

FIG. 5 is a flowchart illustrating an example operation of selecting a set of coded picture buffer (CPB) parameters based on a variable that indicates the set of CPB parameters for a particular random access point (RAP) picture in a bitstream. The illustrated operation is described with respect to video decoder 30 from FIG. 3 that includes CPB 68. In other examples, a similar operation may be performed by video encoder 20 from FIG. 2 that includes CPB 66, destination device 100 from FIG. 4 that includes CPB 106 and video decoder 108, or other devices including video encoders or video decoders with CPBs configured to operate according to HRD operations.

Video decoder 30 receives a bitstream including one or more CRA pictures or BLA pictures (120). Along with the bitstream, video decoder 30 also receives a message indicating whether to use an alternative set of CPB parameters for particular one of the CRA or BLA pictures (122). More specifically, video decoder 30 may receive the message from an external means, such as network entity 29, that is capable of discarding TFD pictures associated with the particular picture, and is also capable of informing video decoder 30 when TFD pictures have been discarded.

For example, when the particular picture had TFD pictures in an original bitstream output from video encoder 20 and the TFD pictures have been discarded by the external means, the message received by video decoder 30 indicates to use the alternative set of CPB parameters for the particular picture. As another example, when the particular picture did not have TFD pictures in the original bitstream output from video encoder 20 or the particular picture had TFD pictures in the original bitstream and the TFD pictures have not been discarded by the external means, the message received by video decoder 30 does not indicate to use the alternative set of CPB parameters for the particular picture. In this case, either the default set or the alternative set of CPB paratmers may be used for the one of the CRA pictures or the BLA pictures based on the NAL unit type of the picture.

Video decoder 30 sets a variable, e.g., UseAltCpbParamsflag, defined to indicate a set of CPB parameters for the particular picture based on the received message (124). For example, video decoder 30 may set UseAltCpbParamsFlag equal to 1 when the received message indicates the alternative set of CPB parameters for the particular picture. Conversely, video decoder 30 may set UseAltCpbParamsFlag equal to 0 when the received message does not explicitly indicate the alternative set of CPB parameters for the particular picture. In some cases, video decoder 30 may not receive a message for at least one of the CRA pictures or the BLA pictures. Video decoder 30 may then set UseAltCpbParamsFlag equal to 0.

Video decoder 30 then sets a NAL unit type for the particular picture (126). In some cases, video decoder 30 may set the NAL unit type for the particular picture as signaled in the bitstream. In other cases, video decoder 30 may set the NAL unit type for the particular picture based at least in part on the variable for the picture. The NAL unit type selection operation is described in more detail below with respect to FIG. 6. Video decoder 30 selects the default set or the alternative set of CPB parameters for the particular picture based on the NAL unit type and the variable for the particular picture (128). In particular, video decoder 30 selects the default set of CPB parameters for one or more NAL unit types when the variable does not indicate the alternative set of CPB parameters, and selects the alternative set of CPB parameters for the one or more NAL unit types when the variable indicates the alternative set of CPB parameters and for one or more different NAL unit types. The CPB parameter set selection operation is described in more detail below with respect to FIG. 7.

Figure 6:
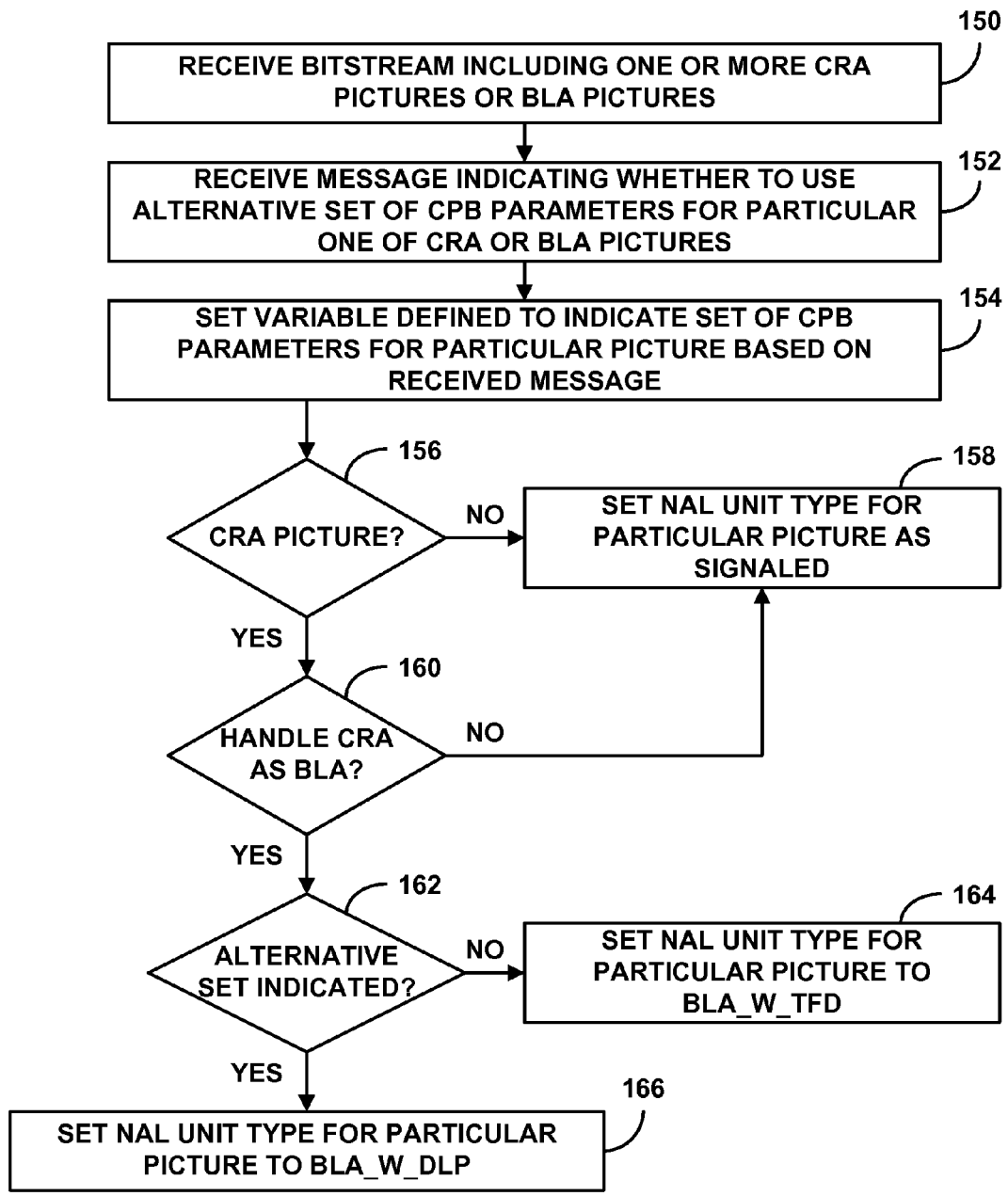
FIG. 6 is a flowchart illustrating an example operation of setting a network layer abstraction (NAL) unit type for a particular RAP picture based on a variable that indicates the set of CPB parameters for the picture.

FIG. 6 is a flowchart illustrating an example operation of setting a network layer abstraction (NAL) unit type for a particular RAP picture based on a variable that indicates the set of CPB parameters for the picture. The illustrated operation is described with respect to video decoder 30 from FIG. 3 that includes CPB 68. In other examples, a similar operation may be performed by video encoder 20 from FIG. 2 that includes CPB 66, destination device 100 from FIG. 4 that includes CPB 106 and video decoder 108, or other devices including video encoders or video decoders with CPBs configured to operate according to HRD operations.

Video decoder 30 receives a bitstream including one or more CRA pictures or BLA pictures (150). Video decoder 30 receives a message indicating whether to use an alternative set of CPB parameters for a particular one of the CRA pictures or the NIA pictures (152). Video decoder 30 sets a variable defined to indicate a set of CPB parameters for the particular picture based on the received message (154).

When the particular picture is a BLA picture (NO branch of 156), video decoder 30 sets the NAL unit type for the particular BLA picture as signaled in the bitstream (158). When the particular picture is a CRA picture (YES branch of 156) and when the CRA pictures is not handled as a BLA picture (NO branch of 160), video decoder 30 also sets the NAL unit type for the particular CRA picture as signaled in the bitstream (158).

Conventionally, when a CRA picture is handled as a BLA picture, the NAL unit type for the CRA picture is set to indicate a BLA picture with non-decodable leading pictures, e.g., BLA_W_TFD, which results in selection of the default set of CPB parameters for the picture. In some cases, the picture may not have associated TFD pictures and the use of the default set of CPB parameters may result in overflow of the CPB. According to the techniques of this disclosure, when the particular picture is a CRA picture (YES branch of 156) and the CRA picture is handled as a BLA picture (YES branch of 160), video decoder 30 sets the NAL unit type for the particular CRA picture based on the variable for the particular picture.

For example, when the variable does not explicitly indicate the alternative set of CPB parameters (NO branch of 162), video decoder 30 sets the NAL unit type for the particular picture to indicate a BLA picture with non-decodable leading pictures, e.g., BLA_W_TFD, which indicates that the particular picture has associated TFD pictures (164). In this case, the default set of CPB parameters will appropriately be selected for the particular picture. When the variable indicates the alternative set of CPB parameters (YES branch of 162), video decoder 30 sets the NAL unit type for the particular picture to indicate a BLA picture with decodable leading pictures, e.g., BLA_W_DLP, which indicates that the particular picture does not have associated TFD pictures (166). In this case, the alternative set of CPB parameters will appropriately be selected for the particular picture. In this way, the techniques ensure that the CPB of the video decoder will not overflow due to use of the inappropriate CPB parameters.

Figure 7:
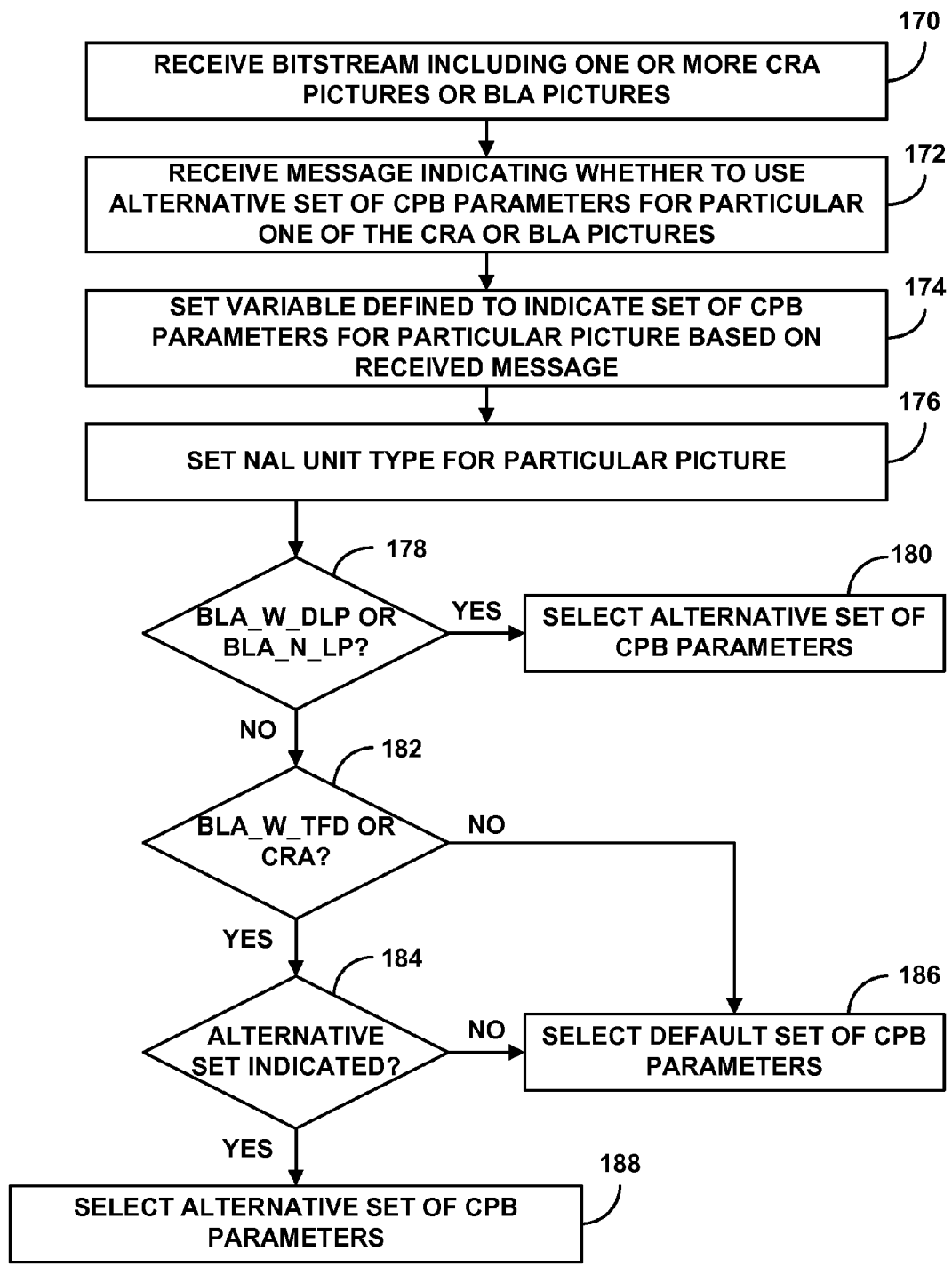
FIG. 7 is a flowchart illustrating an example operation of selecting a set of CPB parameters for a particular RAP picture based on a NAL unit type for the picture and a variable that indicates the set of CPB parameters for the picture.

FIG. 7 is a flowchart illustrating an example operation of selecting a set of CPB parameters for a particular RAP picture based on a NAL unit type for the picture and a variable that indicates the set of CPB parameters for the picture. The illustrated operation is described with respect to video decoder 30 from FIG. 3 that includes CPB 68. In other examples, a similar operation may be performed by video encoder 20 from FIG. 2 that includes CPB 66, destination device 100 from FIG. 4 that includes CPB 106 and video decoder 108, or other devices including video encoders or video decoders with CPBs configured to operate according to HRD operations.

Video decoder 30 receives a bitstream including one or more CRA pictures or BLA pictures (170). Video decoder 30 receives a message indicating whether to use an alternative set of CPB parameters for a particular one of the CRA pictures or the BLA pictures (172). Video decoder 30 sets a variable defined to indicate a set of CPB parameters for the particular picture based on the received message (174). Video decoder 30 then sets a NAL unit type for the particular picture (176). As described above with respect to FIG. 6, video decoder 30 may set the NAL unit type for the particular picture as signaled in the bitstream, or may set the NAL unit type for the particular picture based on the variable for the picture.

When the particular picture is a BLA picture that has a NAL unit type that indicates a BLA picture with decodable leading pictures, e.g., BLA_W_DLP, or indicates a BLA picture with no leading pictures, e.g., BLA_N_LP, which indicates that the particular picture does not have associated TFD pictures (YES branch of 178), video decoder 30 selects the alternative set of CPB parameters for the particular picture based on the NAL unit type (180). Conventionally, the default set of CPB parameters is used for any CRA pictures or BLA pictures with associated TFD pictures, e.g., BLA_W_TFD. In some cases, however, TFD pictures associated with the particular picture in the original bitstream may be discarded before the bitstream reaches a video decoder. The video decoder then uses the default CPB parameters based on the NAL unit type even when the picture no longer has associated TFD pictures, which may result in overflow of the CPB.

According to the techniques of this disclosure, when the particular picture is a CRA picture or a BLA picture that has a NAL unit type that indicates a BLA picture with non-decodable leading pictures, e.g., BLA_W_TFD, which indicates that the particular picture has associated TFD pictures (YES branch of 182), video decoder 30 selects the set of CPB parameters to use for the particular picture based on the variable for the particular picture. For example, when the variable does not explicitly indicate the alternative set of CPB parameters (NO branch of 184), video decoder 30 selects the default set of CPB parameters for the particular picture based on the variable (186). When the variable indicates the alternative set of CPB parameters (YES branch of 184), video decoder 30 selects the alternative set of CPB parameters for the particular picture based on the variable (188). In this way, the techniques ensure that the CPB of the video decoder will not overflow due to use of the inappropriate CPB parameters.

Figure 8:
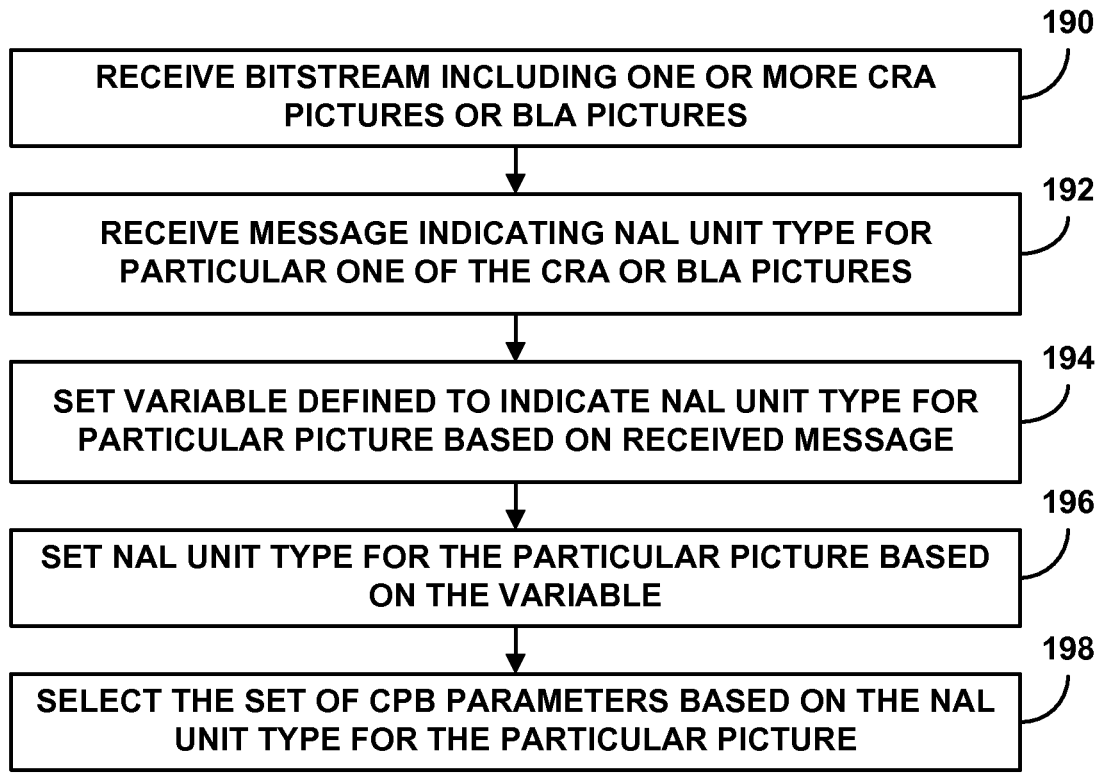
FIG. 8 is a flowchart illustrating an example operation of selecting a set of CPB parameters based on a variable defined to indicate a network layer abstraction (NAL) unit type for a particular RAP picture in a bitstream.

FIG. 8 is a flowchart illustrating an example operation of selecting a set of CPB parameters based on a variable defined to indicate a network layer abstraction (NAL) unit type for a particular RAP picture in a bitstream. The illustrated operation is described with respect to video decoder 30 from FIG. 3 that includes CPB 68. In other examples, a similar operation may be performed by video encoder 20 from FIG. 2 that includes CPB 66, destination device 100 from FIG. 4 that includes CPB 106 and video decoder 108, or other devices including video encoders or video decoders with CPBs configured to operate according to HRD operations.

Video decoder 30 receives a bitstream including one or more CRA pictures or BLA pictures (190). Along with the bitstream, video decoder 30 also receives a message indicating a NAL unit type for a particular one of the CRA or BLA pictures (192). More specifically, video decoder 30 may receive the message from an external means, such as network entity 29, that is capable of discarding TFD pictures associated with the particular picture, and is also capable of informing video decoder 30 when TFD pictures have been discarded.

For example, when the particular picture had TFD pictures in an original bitstream output from video encoder 20 and the TFD pictures have been discarded by the external means, the message received by video decoder 30 may indicate a NAL unit type that indicates a BLA picture with decodable leading pictures, e.g., BLA_W_DLP, or indicates a BLA picture with no leading pictures, e.g., BLA_N_LP, for the particular picture. As another example, when the particular picture had TFD pictures in the original bitstream and the TFD pictures have not been discarded by the external means, the message received by video decoder 30 may indicate a NAL unit type that indicates a BLA picture with non-decodable leading pictures, e.g., BLA_W_TFD, for the one of the CRA pictures or the BLA pictures.

Video decoder 30 sets a variable, e.g., UseThisNalUnitType, defined to indicate a NAL unit type for the particular picture based on the received message (194). For example, video decoder 30 may set UseThisNalUnitType equal to the NAL unit type indicated by the received message for the particular picture. In some cases, video decoder 30 may not receive a message fir at least one of the CRA pictures or the BLA pictures. Video decoder 30 may then set UseThisNalUnitType equal to the NAL unit type signaled for the particular picture in the bitstream. Video decoder 30 sets a NAL unit type for the particular picture based on the variable (196). Video decoder 30 then selects the default set or the alternative set of CPB parameters for the particular picture based on the NAL unit type for the particular picture (198).

Figure 9:
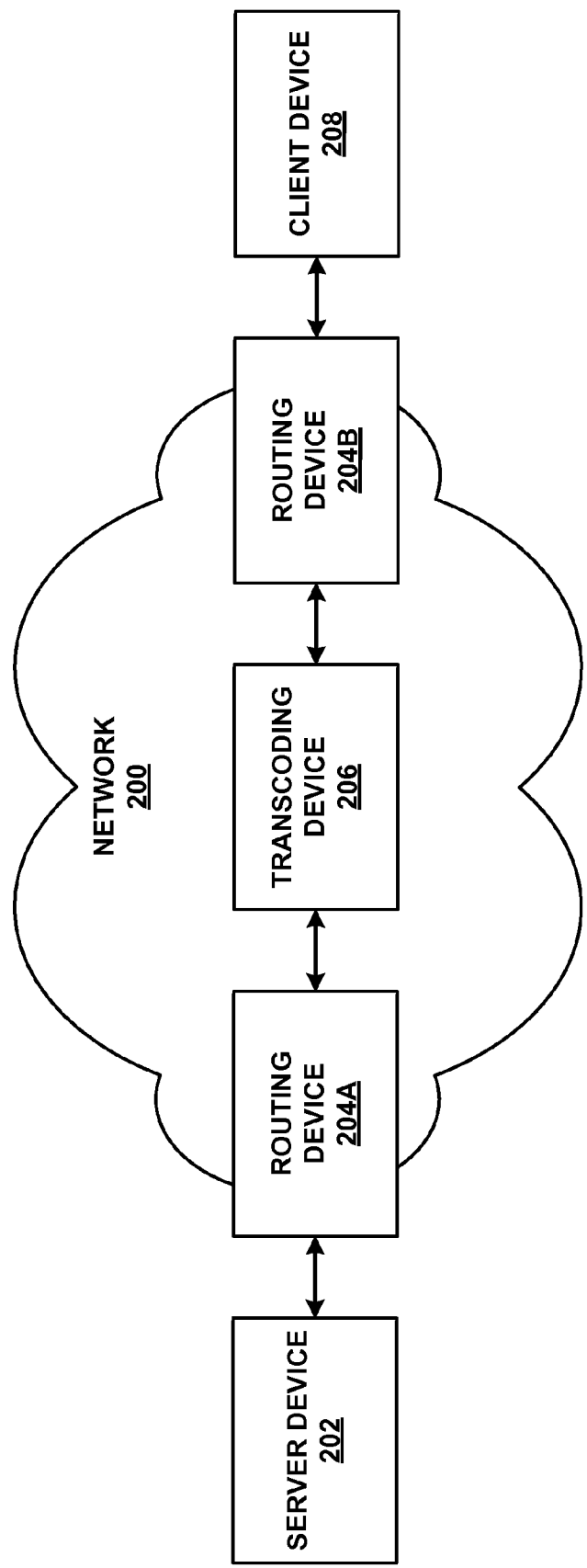
FIG. 9 is a block diagram illustrating an example set of devices that form part of a network.

FIG. 9 is a block diagram illustrating an example set of devices that form part of network 200. In this example, network 200 includes routing devices 204A, 204B (routing devices 204) and transcoding device 206. Routing devices 204 and transcoding device 206 are intended to represent a small number of devices that may form part of network 200. Other network devices, such as switches, hubs, gateways, firewalls, bridges, and other such devices may also be included within network 200. Moreover, additional network devices may be provided along a network path between server device 202 and client device 208. Server device 202 may correspond to source device 12 of FIG. 1, while client device 208 may correspond to destination device 14 of FIG. 1, in some examples.

In general, routing devices 204 implement one or more routing protocols to exchange network data through network 200. In some examples, routing devices 204 may be configured to perform proxy or cache operations. Therefore, in some examples, routing devices 204 may be referred to as proxy devices. In general, routing devices 204 execute routing protocols to discover routes through network 200. By executing such routing protocols, routing device 204B may discover a network route from itself to server device 202 via routing device 204A.

The techniques of this disclosure may be implemented by network devices such as routing devices 204 and transcoding device 206, but also may be implemented by client device 208. In this manner, routing devices 204, transcoding device 206, and client device 208 represent examples of devices configured to perform the techniques of this disclosure, including techniques recited in the CLAIMS portion of this disclosure. Moreover, the devices of FIG. 1, and the encoder shown in FIG. 2 and the decoder shown in FIG. 3 are also exemplary devices that can be configured to perform the techniques of this disclosure, including techniques recited in the CLAIMS portion of this disclosure.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term. "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
   receiving a bitstream representing a plurality of pictures including one or more clean random access (CRA) pictures or one or more broken link access (BLA) pictures;
   receiving, from an external device, a message specifying a value of a variable UseAltCpbParamsFlag, the variable UseAltCpbParamsFlag being indicative of whether to use an alternative set of coded picture buffer (CPB) parameters for at least one of the one or more CRA pictures or the one or more BLA pictures;
   setting the value of the variable UseAltCpbParamsFlag based on the value specified by the received message; and
   selecting one of a default set of CPB parameters or the alternative set of CPB parameters for the at least one of the one or more CRA pictures or the one or more BLA pictures based on the value of the variable UseAltCpbParamsFlag.

2. The method of claim 1, further comprising initializing a hypothetical reference decoder (HRD) using the at least one of the one or more CRA pictures or the one or more BLA pictures and associated HRD parameters, wherein the HRD parameters include the selected set of CPB parameters.

3. The method of claim 1, wherein the at least one of the one or more CRA pictures or the one or more BLA pictures is associated with a network abstraction layer (NAL) unit type that indicates one of a CRA picture or a BLA picture that may have at least one of associated non-decodable leading pictures or associated decodable leading pictures, wherein the value of the variable UseAltCpbParamsFlag does not indicate use of the alternative set of CPB parameters, and wherein selecting one of the default set of CPB parameters or the alternative set of CPB parameters comprises selecting the default set of CPB parameters.

4. The method of claim 1, wherein the at least one of the one or more CRA pictures or the one or more BLA pictures is associated with a network abstraction layer (NAL) unit type that indicates one of a CRA picture or a BLA picture that may have at least one of associated non-decodable leading pictures or associated decodable leading pictures, wherein the value of the variable UseAltCpbParamsFlag indicates use of the alternative set of CPB parameters, and wherein selecting one of the default set of CPB parameters or the alternative set of CPB parameters comprises selecting the alternative set of CPB parameters.

5. The method of claim 1, further comprising setting a network abstraction layer (NAL) unit type for the at least one of the one or more CRA pictures or the one or more BLA pictures, wherein selecting one of a default set of CPB parameters or the alternative set of CPB parameters comprises selecting the one of a default set of CPB parameters or the alternative set of CPB parameters for the at least one of the one or more CRA pictures or the one or more BLA pictures based on the NAL unit type and the value of the variable UseAltCpbParamsFlag.

6. The method of claim 5, wherein the at least one of the one or more CRA pictures or the one or more BLA pictures comprises a CRA picture that is handled as a BLA picture, and wherein setting the NAL unit type comprises setting the NAL unit type for the CRA picture handled as the BLA picture based on the value of the variable UseAltCpbParamsFlag.

7. The method of claim 6, wherein setting the NAL unit type for the CRA picture handled as the BLA picture comprises:
based on the value of the variable UseAltCpbParamsFlag indicating use of the alternative set of CPB parameters, setting the NAL unit type for the CRA picture handled as the BLA picture to indicate a BLA picture with associated decodable leading pictures; and
based on the value of the variable UseAltCpbParamsFlag not indicating use of the alternative set of CPB parameters, setting the NAL unit type for the CRA picture handled as the BLA picture to indicate a BLA picture with associated non-decodable leading pictures.

8. The method of claim 5, wherein the at least one of the one or more CRA pictures or the one or more BLA pictures comprises a CRA picture, and wherein setting the NAL unit type comprises setting the NAL unit type for the CRA picture to indicate a general CRA picture.

9. The method of claim 5, wherein the at least one of the one or more CRA pictures or the one or more BLA pictures comprises a CRA picture, and wherein setting the NAL unit type comprises setting the NAL unit type for the CRA picture to indicate one of a CRA picture with associated non-decodable leading pictures, a CRA picture with associated decodable leading pictures, or a CRA picture with no leading pictures.

10. The method of claim 1, wherein the at least one of the one or more CRA pictures or the one or more BLA pictures had associated non-decodable leading pictures in an original bitstream and the associated non-decodable leading pictures have been discarded by the external device, and wherein the value of the variable UseAltCpbParamsFlag indicates use of the alternative set of CPB parameters for the at least one of the one or more CRA pictures or the one or more BLA pictures.

11. The method of claim 1, wherein the at least one of the one or more CRA pictures or the one or more BLA pictures did not have associated non-decodable leading pictures in an original bitstream or had associated non-decodable leading pictures in the original bitstream and the associated non-decodable leading pictures have not been discarded by the external device, and wherein the value of the variable UseAltCpbParamsFlag does not indicate use of the alternative set of CPB parameters for the at least one of the one or more CRA pictures or the one or more BLA pictures.

12. The method of claim 1, further comprising:
setting, based on not receiving a message indicating whether to use the alternative set of CPB parameters for another one of the one or more CRA pictures or the one or more BLA pictures, the value of the variable UseAltCpbParamsFlag to not indicate use of the alternative set of CPB parameters for the another one of the one or more CRA pictures or the one or more BLA pictures; and
selecting the default set of CPB parameters for the another one of the one or more CRA pictures or the one or more BLA pictures based on the value of the variable UseAltCpbParamsFlag.

13. The method of claim 1, wherein each of the default set of CPB parameters and the alternative set of CPB parameters includes initial CPB removal delays and initial CPB removal delay offsets.

14. The method of claim 1, further comprising applying the selected set of CPB parameters for the at least one of the one or more CRA pictures or the one or more BLA pictures to a CPB included in a video decoding device to ensure that the CPB does not overflow during decoding of the video data.

15. The method of claim 1, further comprising applying the selected set of CPB parameters for the at least one of the one or more CRA pictures or the one or more BLA pictures to a first CPB included in a video encoding device to ensure that the first CPB included in the video encoding device will not overflow during encoding of the video data, and ensure that a second CPB included in a video decoding device does not overflow upon receiving an encoded bitstream generated by the video encoding device.

16. A video coding device for processing video data, the device comprising:
a coded picture buffer (CPB) configured to store video data; and
one or more processors configured to:
receive a bitstream representing a plurality of pictures including one or more clean random access (CRA) pictures or one or more broken link access (BLA) pictures,
receive, from an external device, a message specifying a value of a variable UseAltCpbParamsFlag, the variable UseAltCpbParamsFlag being indicative of whether to use an alternative set of coded picture buffer (CPB) parameters for at least one of the one or more CRA pictures or the one or more BLA pictures,
set the value of the variable UseAltCpbParamsFlag based on the value specified by the received message, and
select one of a default set of CPB parameters or the alternative set of CPB parameters for the at least one of the one or more CRA pictures or the one or more BLA pictures based on the value of the variable UseAltCpbParamsFlag.

17. The video coding device of claim 16, wherein the one or more processors are further configured to initialize a hypothetical reference decoder (HRD) using the at least one of the one or more CRA pictures or the one or more BLA pictures and associated HRD parameters, wherein the HRD parameters include the selected set of CPB parameters for the picture.

18. The video coding device of claim 16, wherein the at least one of the one or more CRA pictures or the one or more BLA pictures is associated with a network abstraction layer (NAL) unit type that indicates one of a CRA picture or a BLA picture that may have at least one of associated non-decodable leading pictures or associated decodable leading pictures, wherein the value of the variable UseAltCpbParamsFlag does not indicate use of the alternative set of CPB parameters, and wherein the one or more processors are further configured to select the default set of CPB parameters.

19. The video coding device of claim 16, wherein the at least one of the one or more CRA pictures or the one or more BLA pictures is associated with a network abstraction layer (NAL) unit type that indicates one of a CRA picture or a BLA picture that may have at least one of associated non-decodable leading pictures or associated decodable leading pictures, wherein the value of the variable UseAltCpbParams- Flag indicates use of the alternative set of CPB parameters, and wherein the one or more processors are further configured to select the alternative set of CPB parameters.

20. The video coding device of claim 16, wherein the one or more processors are further configured to set a network abstraction layer (NAL) unit type for the at least one of the one or more CRA pictures or the one or more BLA pictures, and select the one of a default set of CPB parameters or the alternative set of CPB parameters for the at least one of the one or more CRA pictures or the one or more BLA pictures based on the NAL unit type and the value of the variable UseAltCpbParamsFlag.

21. The video coding device of claim 20, wherein the at least one of the one or more CRA pictures or the one or more BLA pictures comprises a CRA picture that is handled as a BLA picture, and wherein the one or more processors are further configured to set the NAL unit type for the CRA picture handled as the BLA picture based on the value of the variable UseAltCpbParamsFlag.

22. The video coding device of claim 21, wherein:
based on the value of the variable UseAltCpbParamsFlag indicating use of the alternative set of CPB parameters, the one or more processors are further configured to set the NAL unit type for the CRA picture handled as the BLA picture to indicate a BLA picture with associated decodable leading pictures; and
based on the value of the variable UseAltCpbParamsFlag not indicating use of the alternative set of CPB parameters, the one or more processors are further configured to set the NAL unit type for the CRA picture handled as the BLA picture to indicate a BLA picture with associated non-decodable leading pictures.

23. The video coding device of claim 20, wherein the at least one of the one or more CRA pictures or the one or more BLA pictures comprises a CRA picture, and wherein the one or more processors are further configured to set the NAL unit type for the CRA picture to indicate a general CRA picture.

24. The video coding device of claim 20, wherein the at least one of the one or more CRA pictures or the one or more BLA pictures comprises a CRA picture, and wherein the one or more processors are further configured to set the NAL unit type for the CRA picture to indicate one of a CRA picture with associated non-decodable leading pictures, a CRA picture with associated decodable leading pictures, or a CRA picture with no leading pictures.

25. The video coding device of claim 16, wherein the at least one of the one or more CRA pictures or the one or more BLA pictures had associated non-decodable leading pictures in an original bitstream and the associated non-decodable leading pictures have been discarded by the external device, and wherein the value of the variable UseAltCpbParamsFlag indicates use of the alternative set of CPB parameters for the at least one of the one or more CRA pictures or the one or more BLA pictures.

26. The video coding device of claim 16, wherein the at least one of the one or more CRA pictures or the one or more BLA pictures did not have associated non-decodable leading pictures in an original bitstream or had associated non-decodable leading pictures in the original bitstream and the associated non-decodable leading pictures have not been discarded by the external device, and wherein the value of the variable UseAltCpbParamsFlag does not indicate use of the alternative set of CPB parameters for the at least one of the one or more CRA pictures or the one or more BLA pictures.

27. The video coding device of claim 16, wherein the one or more processors are further configured to:
set, based on a lack of receipt of a message indicative of whether to use the alternative set of CPB parameters for another one of the one or more CRA pictures or the one or more BLA pictures, the value of the variable UseAltCpbParamsFlag to not indicate use of the alternative set of CPB parameters for the another one of the one or more CRA pictures or the one or more BLA pictures; and
select the default set of CPB parameters for the another one of the one or more CRA pictures or the one or more BLA pictures based on the value of the variable UseAltCpbParamsFlag.

28. The video coding device of claim 16, wherein each of the default set of CPB parameters and the alternative set of CPB parameters includes initial CPB removal delays and initial CPB removal delay offsets.

29. The video coding device of claim 16, wherein the one or more processors are further configured to apply the selected set of CPB parameters for the at least one of the one or more CRA pictures or the one or more BLA pictures to a CPB included in a video decoding device to ensure that the CPB does not overflow during decoding of the video data.

30. The video coding device of claim 16, wherein the one or more processors are further configured to apply the selected set of CPB parameters for the at least one of the one or more CRA pictures or the one or more BLA pictures to a first CPB included in a video encoding device to ensure that the first CPB included in the video encoding device will not overflow during encoding of the video data, and ensure that a second CPB included in a video decoding device does not overflow upon receiving an encoded bitstream generated by the video encoding device.

31. A video coding device for processing video data, the device comprising:
means for receiving a bitstream representing a plurality of pictures including one or more clean random access (CRA) pictures or one or more broken link access (BLA) pictures;
means for receiving, from an external device, a message specifying a value of a variable UseAltCpbParamsFlag, the variable UseAltCpbParamsFlag being indicative of whether to use an alternative set of coded picture buffer (CPB) parameters for at least one of the one or more CRA pictures or the one or more BLA pictures;
means for setting the value of the variable UseAltCpbParamsFlag based on the value specified by the received message; and
means for selecting one of a default set of CPB parameters or the alternative set of CPB parameters for the at least one of the one or more CRA pictures or the one or more BLA pictures based on the value of the variable UseAltCpbParamsFlag.

32. The video coding device of claim 31, further comprising means for initializing a hypothetical reference decoder (HRD) using the at least one of the one or more CRA pictures or the one or more BLA pictures and associated HRD parameters, wherein the HRD parameters include the selected set of CPB parameters.

33. The video coding device of claim 31, wherein the at least one of the one or more CRA pictures or the one or more BLA pictures is associated with a network abstraction layer (NAL) unit type that indicates one of a CRA picture or a BLA picture that may have at least one of associated non-decodable leading pictures or associated decodable leading pictures, wherein the value of the variable UseAltCpbParamsFlag does not indicate use of the alternative set of CPB parameters, further comprising means for selecting the default set of CPB parameters.

34. The video coding device of claim 31, wherein the at least one of the one or more CRA pictures or the one or more BLA pictures is associated with a network abstraction layer (NAL) unit type that indicates one of a CRA picture or a BLA picture that may have at least one of associated non-decodable leading pictures or associated decodable leading pictures, wherein the value of the variable UseAltCpbParamsFlag indicates use of the alternative set of CPB parameters, further comprising means for selecting the alternative set of CPB parameters.

35. The video coding device of claim 31, further comprising means for setting a network abstraction layer (NAL) unit type for the at least one of the one or more CRA pictures or the one or more BLA pictures, and means for selecting the one of a default set of CPB parameters or the alternative set of CPB parameters for the at least one of the one or more CRA pictures or the one or more BLA pictures based on the NAL unit type and the value of the variable UseAltCpbParamsFlag.

36. The video coding device of claim 35, wherein the at least one of the one or more CRA pictures or the one or more BLA pictures comprises a CRA picture that is handled as a BLA picture, further comprising means for setting the NAL unit type for the CRA picture handled as the BLA picture based on the value of the variable UseAltCpbParamsFlag.

37. The video coding device of claim 31, further comprising means for applying the selected set of CPB parameters for the at least one of the one or more CRA pictures or the one or more BLA pictures to a CPB included in a video decoding device to ensure that the CPB does not overflow during decoding of the video data.

38. The video coding device of claim 31, further comprising means for applying the selected set of CPB parameters for the at least one of the one or more CRA pictures or the one or more BLA pictures to a first CPB included in a video encoding device to ensure that the first CPB included in the video encoding device will not overflow during encoding of the video data, and ensure that a second CPB included in a video decoding device does not overflow upon receiving an encoded bitstream generated by the video encoding device.

39. A non-transitory computer-readable medium comprising instructions for processing video data, the instructions, when executed, cause one or more processors to:
receive a bitstream representing a plurality of pictures including one or more clean random access (CRA) pictures or one or more broken link access (BLA) pictures;
receive, from an external device, a message specifying a value of a variable UseAltCpbParamsFlag, the variable UseAltCpbParamsFlag being indicative of whether to use an alternative set of coded picture buffer (CPB) parameters for at least one of the one or more CRA pictures or the one or more BLA pictures;
set the value of the variable UseAltCpbParamsFlag based on the value specified by the received message; and
select one of a default set of CPB parameters or the alternative set of CPB parameters for the at least one of the one or more CRA pictures or the one or more BLA pictures based on the value of the variable UseAltCpbParamsFlag.

40. The non-transitory computer-readable medium of claim 39, wherein the at least one of the one or more CRA pictures or the one or more BLA pictures is associated with a network abstraction layer (NAL) unit type that indicates one of a CRA picture or a BLA picture that may have at least one of associated non-decodable leading pictures or associated decodable leading pictures, wherein the value of the variable UseAltCpbParamsFlag does not indicate use of the alternative set of CPB parameters, and wherein the instructions cause the one or more processors to select the default set of CPB parameters.

41. The non-transitory computer-readable medium of claim 39, wherein the at least one of the one or more CRA pictures or the one or more BLA pictures comprises one of a CRA picture or a BLA picture with a network abstraction layer (NAL) unit type that indicates one of a CRA picture or a BLA picture with non-decodable leading pictures and the value of the variable UseAltCpbParamsFlag indicates the alternative set of CPB parameters, and wherein the instructions cause the one or more processors to select the alternative set of CPB parameters for the picture.

42. The non-transitory computer-readable medium of claim 39, wherein the instructions cause the one or more processors to set a network abstraction layer (NAL) unit type for the at least one of the one or more CRA pictures or the one or more BLA pictures, and select the one of the default set of CPB parameters or the alternative set of CPB parameters for the at least one of the one or more CRA pictures or the one or more BLA pictures based on the NAL unit type and the value of the variable UseAltCpbParamsFlag.

43. The non-transitory computer-readable medium of claim 42, wherein the at least one of the one or more CRA pictures or the one or more BLA pictures comprises a CRA picture that is handled as a BLA picture, and wherein the instructions cause the one or more processors to set the NAL unit type for the CRA picture handled as the BLA picture based on the value of the variable UseAltCpbParamsFlag.

* * * * *